US012674662B2

(12) United States Patent

Shuall et al.

(10) Patent No.: US 12,674,662 B2

(45) Date of Patent: Jul. 7, 2026

(54) SYSTEM AND METHOD FOR ACQUIRING ALIGNMENT MEASUREMENTS OF STRUCTURES OF A BONDED SAMPLE

(71) Applicant: KLA Corporation, Milpitas, CA (US)

(72) Inventors: Nimrod Shuall, Beaverton, OR (US); Jordan Pio, Milpitas, CA (US); Frank Laske, Weilburg (DE); Stefan Eyring, Weilburg (DE); Ohad Bachar, Timrat (IL)

(73) Assignee: KLA Coporation, Milpitas, CA (US)

( * ) Notice: Subject to any disclaimer, the term of this patent is extended or adjusted under 35 U.S.C. 154(b) by 626 days.

(21) Appl. No.: 17/946,935

(22) Filed: Sep. 16, 2022

(65) Prior Publication Data

US 2024/0093985 A1 Mar. 21, 2024

(51) Int. Cl.
*G01B 11/27* (2006.01)
*G01B 15/00* (2006.01)

(52) U.S. Cl.
CPC .............. *G01B 11/27* (2013.01); *G01B 15/00* (2013.01)

(58) Field of Classification Search
CPC ......... G01B 11/27; G01B 15/00; H01L 22/12; G03F 7/70633
USPC ........... 250/306, 307, 310, 311, 492.1–492.3
See application file for complete search history.

(56) References Cited

U.S. PATENT DOCUMENTS

| | | | |
|---|---|---|---|
| 5,202,748 A | 4/1993 | MacDonald et al. | |
| 6,064,486 A | 5/2000 | Chen et al. | |
| 6,238,939 B1 | 5/2001 | Wachs et al. | |
| 6,335,791 B1 | 1/2002 | Miyatake | |
| 6,600,565 B1 | 7/2003 | Suresh et al. | |

(Continued)

FOREIGN PATENT DOCUMENTS

| | | |
|---|---|---|
| CA | 2334388 A1 | 10/2000 |
| CN | 100552908 C | 10/2009 |

(Continued)

OTHER PUBLICATIONS

Korean Intellectual Property Office, International Search Report and Written Opinion for International Application No. PCT/US2023/032022, Dec. 28, 2023, 9 pages.

(Continued)

*Primary Examiner* — Michael Maskell

(74) *Attorney, Agent, or Firm* — Suiter Swantz IP

(57) ABSTRACT

Systems and methods for acquiring measurements of structures of a bonded sample are disclosed. Such systems and methods may include determining a first registration measurement of a first registration structure and a first interface target structure of a first sample, and a second registration measurement of a second sample prior to coupling the samples together. Such systems and methods may include, after such a coupling of the samples, determining a third registration measurement of the coupled sample at least partially by measuring the first registration structure through the top face of the first sample. Such systems and methods may include acquiring an overlay measurement based on the first registration measurement, the second registration measurement, and the third registration measurement. Such systems and methods may include adjusting an inter-sample coupling recipe based on the overlay measurement, where the inter-sample coupling recipe may include a final bonding recipe.

46 Claims, 11 Drawing Sheets

(56) References Cited

U.S. PATENT DOCUMENTS

| | | | |
|---|---|---|---|
| 6,762,846 | B1 | 7/2004 | Poris |
| 6,847,458 | B2 | 1/2005 | Freischlad et al. |
| 7,056,751 | B2 | 6/2006 | Faris |
| 7,079,257 | B1 | 7/2006 | Kirkpatrick et al. |
| 7,433,051 | B2 | 10/2008 | Owen |
| 7,570,796 | B2 | 8/2009 | Zafar et al. |
| 7,676,077 | B2 | 3/2010 | Kulkarni et al. |
| 7,875,528 | B2 | 1/2011 | La Tulipe, Jr et al. |
| 8,163,570 | B2 | 4/2012 | Castex et al. |
| 8,394,719 | B2 | 3/2013 | Tsen et al. |
| 8,475,612 | B2 | 7/2013 | Gaudin |
| 8,575,002 | B2 | 11/2013 | Broekaart et al. |
| 8,640,548 | B2 | 2/2014 | Wimplinger |
| 8,703,368 | B2 | 4/2014 | Lee et al. |
| 8,768,665 | B2 | 7/2014 | Veeraraghavan et al. |
| 8,769,453 | B2 | 7/2014 | Scheffer et al. |
| 8,859,335 | B2 | 10/2014 | Lee et al. |
| 8,892,237 | B2 | 11/2014 | Vaid et al. |
| 8,900,885 | B1 | 12/2014 | Hubbard et al. |
| 8,949,057 | B1 | 2/2015 | Seong et al. |
| 9,087,176 | B1 | 7/2015 | Chang et al. |
| 9,116,442 | B2 | 8/2015 | Adel et al. |
| 9,121,684 | B2 | 9/2015 | Tang et al. |
| 9,312,161 | B2 | 4/2016 | Wimplinger et al. |
| 9,354,526 | B2 | 5/2016 | Vukkadala et al. |
| 9,466,538 | B1 | 10/2016 | Skordas et al. |
| 9,733,075 | B2 | 8/2017 | Broekaart et al. |
| 9,779,202 | B2 | 10/2017 | Vukkadala et al. |
| 9,852,972 | B2 | 12/2017 | Seddon et al. |
| 9,915,625 | B2 | 3/2018 | Gao et al. |
| 9,935,022 | B2 | 4/2018 | Owen |
| 10,024,654 | B2 | 7/2018 | Smith et al. |
| 10,234,772 | B2 | 3/2019 | Bangar et al. |
| 10,249,523 | B2 | 4/2019 | Vukkadala et al. |
| 10,267,746 | B2 | 4/2019 | Duffy et al. |
| 10,325,798 | B2 | 6/2019 | Wimplinger et al. |
| 10,401,279 | B2 | 9/2019 | Vukkadala et al. |
| 10,622,233 | B2 | 4/2020 | Hooge et al. |
| 10,649,447 | B2 | 5/2020 | Izikson et al. |
| 10,788,759 | B2 | 9/2020 | Tsai et al. |
| 10,886,256 | B2 | 1/2021 | Guo |
| 11,289,422 | B2 | 3/2022 | Yan et al. |
| 11,335,607 | B2 | 5/2022 | Ip |
| 11,393,118 | B2 | 7/2022 | Agarwal et al. |
| 11,710,649 | B2 | 7/2023 | Mizuta |
| 11,768,441 | B2 | 9/2023 | Berge et al. |
| 11,782,411 | B2 | 10/2023 | Zach et al. |
| 11,829,077 | B2 | 11/2023 | Zach et al. |
| 12,164,277 | B2 | 12/2024 | Zach et al. |
| 12,197,137 | B2 | 1/2025 | Zach et al. |
| 2002/0071112 | A1 | 6/2002 | Smith et al. |
| 2002/0105649 | A1 | 8/2002 | Smith et al. |
| 2004/0023466 | A1 | 2/2004 | Yamauchi |
| 2004/0075825 | A1 | 4/2004 | Suresh et al. |
| 2005/0066739 | A1 | 3/2005 | Gotkis et al. |
| 2005/0087578 | A1 | 4/2005 | Jackson |
| 2005/0147902 | A1 | 7/2005 | Schaar et al. |
| 2005/0254030 | A1 | 11/2005 | Tolsma et al. |
| 2005/0271955 | A1 | 12/2005 | Cherala et al. |
| 2006/0141743 | A1 | 6/2006 | Best et al. |
| 2006/0170934 | A1 | 8/2006 | Picciotto et al. |
| 2006/0216025 | A1 | 9/2006 | Kihara et al. |
| 2007/0037318 | A1 | 2/2007 | Kim |
| 2007/0064243 | A1 | 3/2007 | Yunus et al. |
| 2007/0212856 | A1 | 9/2007 | Owen |
| 2007/0242271 | A1 | 10/2007 | Moon |
| 2008/0030701 | A1 | 2/2008 | Lof |
| 2008/0057418 | A1 | 3/2008 | Seltmann et al. |
| 2008/0106714 | A1 | 5/2008 | Okita |
| 2008/0182344 | A1 | 7/2008 | Mueller et al. |
| 2008/0188036 | A1 | 8/2008 | Tulipe et al. |
| 2008/0199978 | A1 | 8/2008 | Fu et al. |
| 2008/0316442 | A1 | 12/2008 | Adel et al. |
| 2010/0102470 | A1 | 4/2010 | Mokaberi |
| 2011/0172982 | A1 | 7/2011 | Veeraraghavan et al. |

| | | | |
|---|---|---|---|
| 2011/0210104 | A1 | 9/2011 | Wahlsten et al. |
| 2011/0265578 | A1 | 11/2011 | Johnson et al. |
| 2012/0006463 | A1 | 1/2012 | Gaudin |
| 2012/0255365 | A1 | 10/2012 | Wimplinger |
| 2013/0054154 | A1 | 2/2013 | Broekaart et al. |
| 2013/0286395 | A1 | 10/2013 | Lee et al. |
| 2014/0057450 | A1 | 2/2014 | Bourbina et al. |
| 2014/0102221 | A1 | 4/2014 | Rebhan et al. |
| 2014/0209230 | A1 | 7/2014 | Wagenleitner |
| 2015/0044786 | A1 | 2/2015 | Huang et al. |
| 2015/0120216 | A1 | 4/2015 | Vukkadala et al. |
| 2015/0279709 | A1 | 10/2015 | La Tulipe et al. |
| 2016/0005662 | A1 | 1/2016 | Yieh et al. |
| 2016/0172254 | A1 | 6/2016 | Wimplinger |
| 2017/0162456 | A1 | 6/2017 | Owen |
| 2017/0221856 | A1 | 8/2017 | Yamauchi |
| 2017/0243853 | A1 | 8/2017 | Huang et al. |
| 2018/0165404 | A1 | 6/2018 | Eyring et al. |
| 2018/0342410 | A1 | 11/2018 | Hooge et al. |
| 2019/0122915 | A1 | 4/2019 | Mitsuishi et al. |
| 2019/0148184 | A1 | 5/2019 | Sugaya et al. |
| 2019/0206711 | A1 | 7/2019 | Wimplinger et al. |
| 2019/0257647 | A1 | 8/2019 | Ichinose et al. |
| 2019/0271542 | A1 | 9/2019 | Shchegrov et al. |
| 2019/0287854 | A1 | 9/2019 | Miller et al. |
| 2019/0353582 | A1 | 11/2019 | Vukkadala et al. |
| 2020/0018709 | A1 | 1/2020 | Hosler et al. |
| 2020/0091015 | A1 | 3/2020 | Sugaya et al. |
| 2020/0328060 | A1 | 10/2020 | Iizuka |
| 2021/0296147 | A1 | 9/2021 | Mizuta |
| 2022/0034823 | A1 | 2/2022 | Ono et al. |
| 2022/0187718 | A1 | 6/2022 | Zach et al. |
| 2022/0230099 | A1 | 7/2022 | Pandith et al. |
| 2022/0344282 | A1 | 10/2022 | Subrahmanyan et al. |
| 2023/0030116 | A1 | 2/2023 | Zach et al. |
| 2023/0032406 | A1 | 2/2023 | Zach et al. |
| 2023/0035201 | A1 | 2/2023 | Zach et al. |
| 2024/0094642 | A1 | 3/2024 | Zach et al. |

FOREIGN PATENT DOCUMENTS

| | | | | |
|---|---|---|---|---|
| CN | 100562784 | C | | 11/2009 |
| CN | 101727011 | A | | 6/2010 |
| CN | 103378067 | A | | 10/2013 |
| CN | 102656678 | B | | 4/2015 |
| CN | 104977816 | A | | 10/2015 |
| CN | 103283000 | B | | 10/2016 |
| CN | 106547171 | A | | 3/2017 |
| CN | 104658950 | B | | 1/2018 |
| CN | 109451761 | A | | 3/2019 |
| CN | 106887399 | B | | 2/2020 |
| CN | 109891563 | B | | 2/2021 |
| CN | 114361014 | A | | 4/2022 |
| CN | 114361014 | B | * | 7/2024 |
| EP | 1829130 | A1 | | 9/2007 |
| EP | 2299472 | A1 | | 3/2011 |
| EP | 2463892 | A1 | | 6/2012 |
| EP | 2463892 | B1 | | 4/2013 |
| EP | 2656378 | B1 | | 3/2015 |
| EP | 2863421 | A1 | | 4/2015 |
| EP | 1829130 | B1 | | 7/2016 |
| EP | 2854157 | B1 | | 1/2019 |
| EP | 3460833 | A1 | | 3/2019 |
| GB | 2462734 | B | | 5/2010 |
| JP | H11135413 | A | | 5/1999 |
| JP | H11176749 | A | | 7/1999 |
| JP | 2001068429 | A | | 3/2001 |
| JP | 2001077012 | A | | 3/2001 |
| JP | 2002118052 | A | | 4/2002 |
| JP | 2002229044 | | | 9/2005 |
| JP | 2005233928 | A | | 9/2005 |
| JP | 2005251972 | A | | 9/2005 |
| JP | 2006186377 | A | | 7/2006 |
| JP | 2007158200 | A | | 6/2007 |
| JP | 2007173526 | A | | 7/2007 |
| JP | 2009113312 | A | | 5/2009 |
| JP | 2009529785 | A | | 8/2009 |
| JP | 2009239095 | A | | 10/2009 |
| JP | 2009294001 | B | | 12/2009 |

(56) References Cited

FOREIGN PATENT DOCUMENTS

| | | | |
|---|---|---|---|
| JP | 2010529659 A | 8/2010 |
| JP | 2010272707 A | 12/2010 |
| JP | 5611371 B2 | 10/2014 |
| JP | 6279324 B2 | 2/2018 |
| JP | 2018036317 A | 3/2018 |
| JP | 202002176 A | 2/2020 |
| JP | 2022098312 A | 7/2022 |
| KR | 20040014686 A | 2/2004 |
| KR | 20040046696 A | 6/2004 |
| KR | 100914446 B1 | 8/2009 |
| KR | 20090099871 A | 9/2009 |
| KR | 101313909 B1 | 10/2013 |
| KR | 20140069352 A | 6/2014 |
| KR | 101801409 B1 | 12/2017 |
| KR | 101849443 B1 | 4/2018 |
| KR | 101866622 B1 | 6/2018 |
| KR | 101866719 B1 | 6/2018 |
| KR | 20180065033 A | 6/2018 |
| KR | 102161093 B1 | 9/2020 |
| SG | 181435 A1 | 7/2012 |
| SG | 187694 A1 | 3/2013 |
| TW | 200421422 A | 10/2004 |
| TW | 201322353 A | 6/2013 |
| TW | I447842 B | 8/2014 |
| TW | 201532165 A | 8/2015 |
| TW | 201630217 A | 8/2016 |
| TW | I563548 B | 12/2016 |
| TW | I563549 B | 12/2016 |
| TW | I618130 B | 3/2018 |
| TW | 201946099 A | 12/2019 |
| TW | I680506 B | 12/2019 |
| TW | 202127649 A | 7/2021 |
| WO | 2005067046 A1 | 7/2005 |
| WO | 2009113312 A1 | 9/2009 |
| WO | 2012079786 A1 | 6/2012 |
| WO | 2012083978 A1 | 6/2012 |
| WO | 2012126752 A1 | 9/2012 |
| WO | 2012135513 A1 | 10/2012 |
| WO | 2013158039 A3 | 6/2016 |
| WO | 2017217431 A1 | 12/2017 |
| WO | 2018012300 A1 | 1/2018 |
| WO | 2018071716 A1 | 4/2018 |
| WO | 2019146427 A1 | 8/2019 |
| WO | 2020045158 A1 | 3/2020 |
| WO | 2020226152 A1 | 11/2020 |
| WO | 2021106527 A1 | 6/2021 |
| WO | 2022125343 A1 | 6/2022 |

OTHER PUBLICATIONS

European Patent Office, Extended European Search Report received in EP Application No. 22850076.5, Feb. 20, 2025, 11 pages.

European Patent Office, Extended European Search Report received in EP Application No. 22850101.1, Mar. 5, 2025, 14 pages.

Sakanas et al., "Comparison of processing-induced deformations of InP bonded to Si determined by e-beam metrology: direct vs. adhesion bonding," Dec. 4, 2018, 7 pages.

Steen et al., "Overlay as the key to drive wafer scale 3D integration," Microelectronic Engineering, vol. 84, May 2007, 4 pages.

Taiwan Patent Office, Office Action received in TW Application No. 111121141, Nov. 25, 2024, 11 pages.

Aitken, et al. "Discussion of tooling solutions for the direct bonding of silicon wafers." Microsystem Technologies 12 (2006): 413-417.

Burns et al., "A wafer-scale 3-D circuit integration technology," in IEEE Transactions on Electron Devices, vol. 53, No. 10, pp. 2507-2516, Oct. 2006, doi: 10.1109/TED.2006.882043.

Burns, et al. "An SOI-based three-dimensional integrated circuit technology." 2000 IEEE International SOI Conference. Proceedings (Cat. No.00CH37125) (2000): 20-21.

Chan, et al. "An approach for alignment, mounting, and integration of IXO mirror segments." Optical Engineering + Applications (2009).

Chen, Kuan-Neng (2005). Copper Wafer Bonding in Three-Dimensional Integration [Published Doctoral thesis] Massachusetts Institute of Technology.

Choi, et al., Distortion and overlay performance of UV step and repeat imprint lithography, Microelectronic Engineering, vols. 78-79, 2005, pp. 633-640, ISSN 0167-9317, https://doi.org/10.1016/j.mee.2004.12.097.

Cotte, et al., "Film stress changes during anodic bonding of NGL masks," Proc. SPIE 3997, Emerging Lithographic Technologies IV, (Jul. 21, 2000); https://doi.org/10.1117/12.390089.

Di Cioccio, et al., "Direct bonding for wafer level 3D integration," 2010 IEEE International Conference on Integrated Circuit Design and Technology, 2010, pp. 110-113, doi: 10.1109/ICICDT.2010.5510276.

Feng, et al., (Jan. 14, 2007). "On the Stoney Formula for a Thin Film/Substrate System With Nonuniform Substrate Thickness." ASME. J. Appl. Mech. Nov. 2007; 74(6): 1276-1281. https://doi.org/10.1115/1.2745392.

Garnier, et al., "Results on aligned SiO2/SiO2 direct wafer-to-wafer low temperature bonding for 3D integration," 2009 IEEE International SOI Conference, 2009, pp. 1-2, doi: 10.1109/SOI.2009.5318753.

Gegenwarth et al., "Effect of Plastic Deformation of Silicon Wafers on Overlay", Proc. SPIE 0100, Developments in Semiconductor Microlithography II, (Aug. 8, 1977); https://doi.org/10.1117/12.955355.

Goyal, et al., "Solder bonding for microelectromechanical systems (MEMS) applications," Proc. SPIE 4980, Reliability, Testing, and Characterization of MEMS/MOEMS II, (Jan. 16, 2003); https://doi.org/10.1117/12.478202.

Hanna, et al., "Numerical and experimental study of the evolution of stresses in flip chip assemblies during assembly and thermal cycling," 1999 Proceedings. 49th Electronic Components and Technology Conference (Cat. No. 99CH36299), 1999, pp. 1001-1009, doi: 10.1109/ECTC.1999.776308.

Huston, et al., (2004). Active membrane masks for improved overlay performance in proximity lithography. Proc SPIE. 5388. 11-19. 10.1117/12.546598.

Liu, et al., "Application of IVS Overlay Measurement to Wafer Deformation Characterization Study." (2004).

Meinhold, et al., (2004). Sensitive Strain Measurements of Bonded SOI Films Using Moiré. Semiconductor Manufacturing, IEEE Transactions on. 17. 35-41. 10.1109/TSM.2003.823259.

Nagarajan, R. (2008). Commercialization of low temperature copper thermocompression bonding for 3D integrated circuits. [Published Masters thesis] Massachusetts Institute of Technology.

Nagaswami, et al., "DPL Overlay Components," 6th International Symp. on Immersion Lithography Extensions, Prague, Nov. 2009.

Nagaswami, et al., (2010). Overlay error components in double-patterning lithography. Solid State Technology. 53. 26-28.

Raghunathan, et al., (2009). Correlation of overlay performance and reticle substrate non-flatness effects in EUV lithography. Proc SPIE. 7488. 10.1117/12.834746.

Rudack, et al., (2010). IR microscopy as an early electrical yield indicator in bonded wafer pairs used for 3D integration. 10.1117/12.848400.

Schaper,et al., "Induced thermal stress fields for three-dimensional distortion control of Si wafer topography", <i>Review of Scientific Instruments</i>, vol. 75, No. 6, pp. 1997-2002, 2004. doi: 10.1063/1.1753101.

Shetty, et al., "Impact of laser spike annealing dwell time on wafer stress and photolithography overlay errors," 2009 International Workshop on Junction Technology, 2009, pp. 119-122, doi: 10.1109/IWJT.2009.5166234.

Steen, et al. "Overlay as the key to drive wafer scale 3D integration." Microelectronic Engineering 84 (2007): 1412-1415.

Tippur, Hareesh V . . . "Simultaneous and real-time measurement of slope and curvature fringes in thin structures using shearing interferometery." Optical Engineering 43 (2004): 3014-3020.

Tupek, et al., "Submicron aligned wafer bonding via capillary forces." Journal of Vacuum Science & Technology B 25 (2007): 1976-1981.

(56)            References Cited

OTHER PUBLICATIONS

Turner, et al., (2002). Modeling of direct wafer bonding: Effect of wafer bow and etch patterns. Journal of Applied Physics. 92. 7658-7666. 10.1063/1.1521792.
Turner, et al., (2004). Mechanics of wafer bonding: Effect of clamping. Journal of Applied Physics. 95. 10.1063/1.1629776.
Turner, et al., "Mechanics of direct wafer bonding." Proceedings of the Royal Society A: Mathematical, Physical and Engineering Sciences 462 (2005): 171-188.
Turner, Kevin T. et al. "Predicting distortions and overlay errors due to wafer deformation during chucking on lithography scanners." Journal of Micro-nanolithography Mems and Moems 8 (2009): 043015.
Aitken et al., (2006). Discussion of tooling solutions for the direct bonding of silicon wafers. Microsystem Technologies. 12. 413-417. 10.1007/s00542-005-0028-4.
Aitken et al., "Glass-Glass Wafer Bonding for Microfluidic Devices." Proceedings of the 2008 Second International Conference on Integration and Commercialization of Micro and Nanosystems. 2008 Second International Conference on Integration and Commercialization of Micro and Nanosystems. Clear Water Bay, Kowloon, Hong Kong. Jun. 3-5, 2008. pp. 529-533. ASME. https://doi.org/10.1115/MicroNano2008-70293.
Burns J. et al. (2008) An SOI-Based 3D Circuit Integration Technology. In: Tan C., Gutmann R., Reif L. (eds) Wafer Level 3-D ICs Process Technology. Integrated Circuits and Systems. Springer, Boston, MA. https://doi.org/10.1007/978-0-387-76534-1_8.
Burns, J.A., et al., "A wafer-scale 3-D circuit integration technology," in IEEE Transactions on Electron Devices, vol. 53, No. 10, pp. 2507-2516, Oct. 2006, doi: 10.1109/TED.2006.882043.
Byelyayev, Anton, "Stress diagnostics and crack detection in full-size silicon wafers using resonance ultrasonic vibrations" (2005). Graduate Theses and Dissertations.http://scholarcommons.usf.edu/etd/2969.
Chen, Kuan-Neng (2005). Copper Wafer Bonding in Three-Dimensional Integration [Unpublished Doctoral thesis] Massachusetts Institute of Technology.
Choi et al., (2005). Distortion and overlay performance of UV step and repeat imprint lithography. Microelectronic Engineering. 78-79. 633-640. 10.1016/j.mee.2004.12.097.
De Wolf, "Raman Spectroscopy: About Chips and Stress", Ramanspectoscopy, IMEC, Kapeldreef 75, B-3001 Leuven, Belgium 2003.
Di Cioccio, L. et al., "Direct bonding for wafer level 3D integration," 2010 IEEE International Conference on Integrated Circuit Design and Technology, 2010, pp. 110-113, doi: 10.1109/ICICDT.2010.5510276.
Garnier, A. et al., "Results on aligned SiO2/SiO2 direct wafer-to-wafer low temperature bonding for 3D integration," 2009 IEEE International SOI Conference, 2009, pp. 1-2, doi: 10.1109/SOI.2009.5318753.
Hanna et al., (1999). Numerical and experimental study of the evolution of stresses in flip chip assemblies during assembly and thermal cycling. 1001-1009. 10.1109/ECTC.1999.776308.
Horn et al., (2008). Detection and Quantification of Surface Nanotopography-Induced Residual Stress Fields in Wafer-Bonded Silicon. Journal of the Electrochemical Society. 155. H36-H42. 10.1149/1.2799880.
International Search Report and Written Opinion in Application No. PCT/US2021/061310 dated Mar. 28, 2022, 8 pages.
Lim, et al., "Warpage Modeling and Characterization to Simulate the Fabrication Process of Wafer-Level Adhesive Bonding," 2007 32nd IEEE/CPMT International Electronic Manufacturing Technology Symposium, 2007, pp. 298-302, doi: 10.1109/IEMT.2007.4417081.
Liu et al., Application of IVS Overlay Measurement to Wager Deformation Characterization Study (2004).

Meinhold et al., "Sensitive strain measurements of bonded SOI films using Moire/spl acute/," in IEEE Transactions on Semiconductor Manufacturing, vol. 17, No. 1, pp. 35-41, Feb. 2004, doi: 10.1109/TSM.2003.823259.
Nagarajan, R. (2009). Commercialization of low temperature copper thermocompression bonding for 3D integrated circuits. [unpublished Masters thesis] Massachusetts Institute of Technology.
Nagaswami et al., Overlay error components in double-patterning lithography, retrieved from Internet Sep. 2010.
Nagaswami, et al., "Double Patterning Lithography Overlay Components," 6th International Symp. on Immersion Lithography Extensions, Prague, Nov. 2009.
Raghunathan et al., "Correlation of overlay performance and reticle substrate non-flatness effects in EUV lithography", Proc. SPIE 7488, Photomask Technology 2009, 748816 (Sep. 30, 2009); https://doi.org/10.1117/12.834746.
Rudack et al., "IR microscopy as an early electrical yield indicator in bonded wafer pairs used for 3D integration," Proc. SPIE 7638, Metrology, Inspection, and Process Control for Microlithography XXIV, 763815 (Apr. 1, 2010); https://doi.org/10.1117/12.848400.
Search Report and Written Opinion in International Application No. PCT/US2022/036745 dated Nov. 9, 2022, 8 pages.
Search Report and Written Opinion in International Application No. PCT/US2022/037522 dated Nov. 9, 2022. 9 pages.
Search Report and Written Opinion in International Application No. PCT/US2022/038412 dated Nov. 16, 2022, 8 pages.
Steen et al., (2007). Overlay as the key to drive wafer scale 3D integration. Microelectronic Engineering. 84. 1412-1415. 10.1016/j.mee.2007.01.231.
Tanaka, Tetsu et al., "3D LSI technology and reliability issues", Digest of Technical Papers—Symposium on VLSI Technology (2011).
Tupek, Michael et al., "Submicron aligned wafer bonding via capillary forces." Journal of Vacuum Science & Technology B 25 (2007): 1976-1981.
Turner et al., "Predicting distortions and overlay errors due to wafer deformation during chucking on lithography scanners," J. Micro/Nanolith. MEMS MOEMS 8(4) 043015 (Oct. 1, 2009) https://doi.org/10.1117/1.3247857.
Turner, K. T.et al., "Modeling of direct wafer bonding: Effect of wafer bow and etch patterns", Journal of Applied Physics, vol. 92, No. 12, pp. 7658-7666, 2002. doi:10.1063/1.1521792.
Turner, Kevin T., "Wafer-Bonding: Mechanics-Based Models and Experiments", Massachusetts Institute of Technology, May 2004, Thesis, 186 pages.
Y Gogotsi et al., "Raman Microspectroscopy Study of Processing-Induced Phase Transformations and Residual Stress in Silicon", Semiconductor Science and Technology, vol. 14, No. 10, Department of Mechanical Engineering, University of Illinois at Chicago, Chicago, IL, Mar. 4, 1999.
Asundi et al., "Rapid Defect Detections of Bonded Wafer using near Infrared Polariscope," Instrumentation, Metrology, and Standards for Nanomanufacturing, Optics, and Semiconductors, Proc. of SPIE, vol. 8105, 2011, 11 pages.
European Patent Office, Extended European Search Report received in EP Application No. 22850212.6, Jul. 2, 2025, 10 pages.
Taiwan Patent Office, Office Action received in TW Application No. 111121774, Jul. 30, 2025, 18 pages (including translation).
European Patent Office, Extended European Search Report received in EP Application No. 21904130.8, Sep. 17, 2024, 11 pages.
Japanese Patent Office, Office Action received in JP Application No. 2023-533686, Dec. 19, 2024, 15 pages (including translation).
Taiwan Patent Office, Office Action received in TW Application No. 110126925, Oct. 25, 2024, 8 pages (including translation).
Taiwan Patent Office, Taiwan Office Action for Application No. TW111128372 dated Jan. 5, 2026, 20 pages (with translation).

* cited by examiner

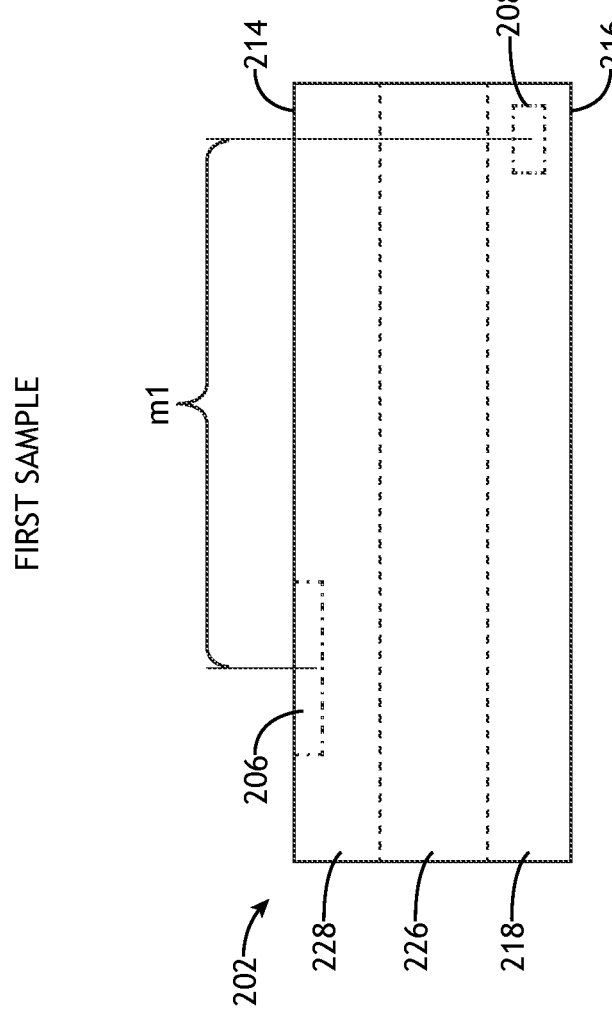
FIRST SAMPLE
m1
214
208
216
206
202
228
226
218
FIG.2B
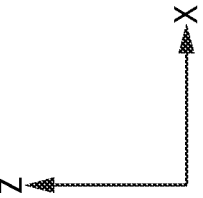
X
Z

300

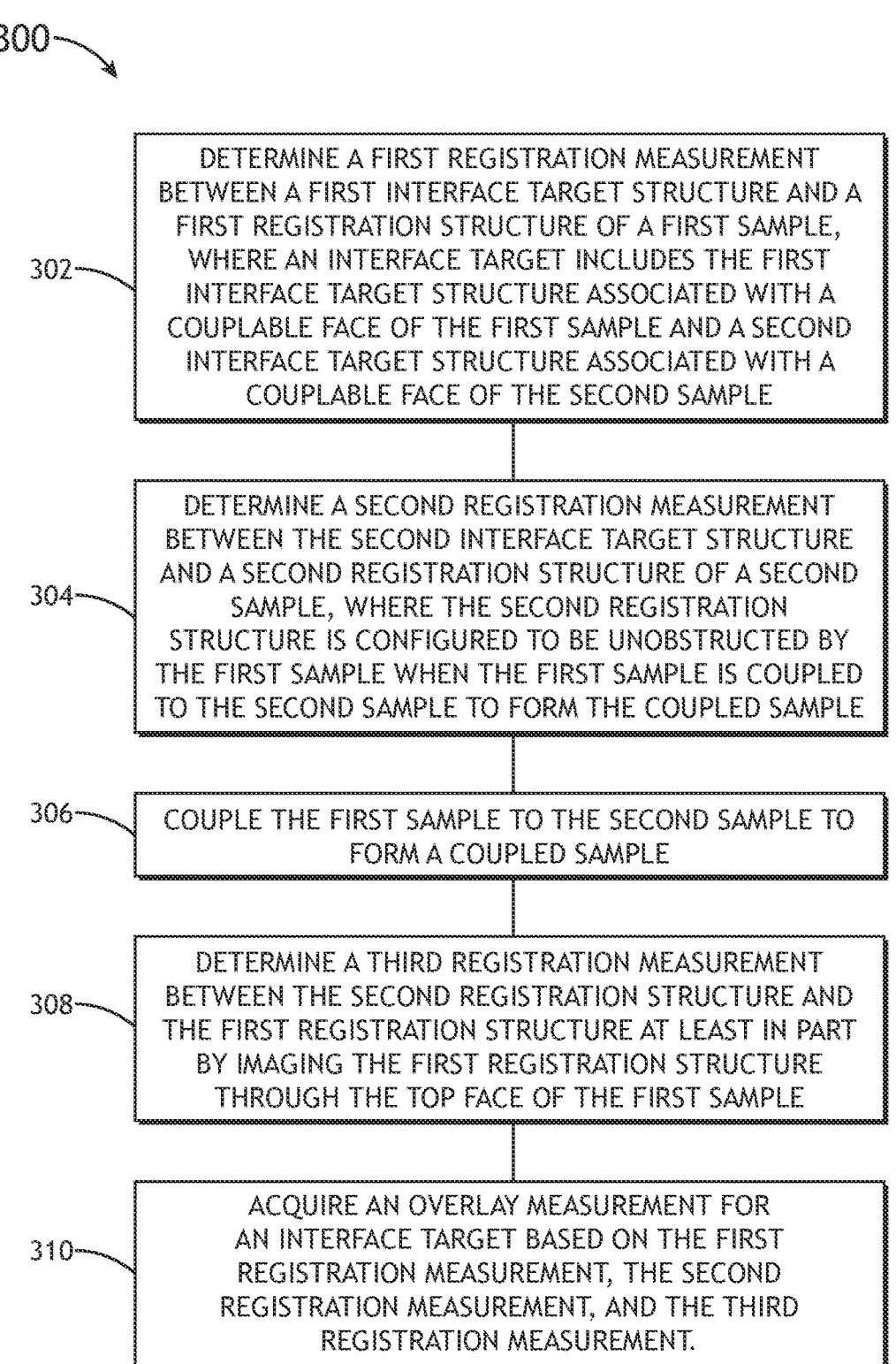

302 — DETERMINE A FIRST REGISTRATION MEASUREMENT BETWEEN A FIRST INTERFACE TARGET STRUCTURE AND A FIRST REGISTRATION STRUCTURE OF A FIRST SAMPLE, WHERE AN INTERFACE TARGET INCLUDES THE FIRST INTERFACE TARGET STRUCTURE ASSOCIATED WITH A COUPLABLE FACE OF THE FIRST SAMPLE AND A SECOND INTERFACE TARGET STRUCTURE ASSOCIATED WITH A COUPLABLE FACE OF THE SECOND SAMPLE

304 — DETERMINE A SECOND REGISTRATION MEASUREMENT BETWEEN THE SECOND INTERFACE TARGET STRUCTURE AND A SECOND REGISTRATION STRUCTURE OF A SECOND SAMPLE, WHERE THE SECOND REGISTRATION STRUCTURE IS CONFIGURED TO BE UNOBSTRUCTED BY THE FIRST SAMPLE WHEN THE FIRST SAMPLE IS COUPLED TO THE SECOND SAMPLE TO FORM THE COUPLED SAMPLE

306 — COUPLE THE FIRST SAMPLE TO THE SECOND SAMPLE TO FORM A COUPLED SAMPLE

308 — DETERMINE A THIRD REGISTRATION MEASUREMENT BETWEEN THE SECOND REGISTRATION STRUCTURE AND THE FIRST REGISTRATION STRUCTURE AT LEAST IN PART BY IMAGING THE FIRST REGISTRATION STRUCTURE THROUGH THE TOP FACE OF THE FIRST SAMPLE

310 — ACQUIRE AN OVERLAY MEASUREMENT FOR AN INTERFACE TARGET BASED ON THE FIRST REGISTRATION MEASUREMENT, THE SECOND REGISTRATION MEASUREMENT, AND THE THIRD REGISTRATION MEASUREMENT.

FIG.3

FIRST SAMPLE BEFORE BEING FLIPPED AND COUPLED

DIE EDGE STRUCTURE

600

206

504

230 m1j m1i m1h m1e m1f

PROCESS STACK

DIE

208

202

FIRST SAMPLE
PROVIDING WAFER

SYSTEM AND METHOD FOR ACQUIRING ALIGNMENT MEASUREMENTS OF STRUCTURES OF A BONDED SAMPLE

TECHNICAL FIELD

The present disclosure relates generally to metrology and, more particularly, to metrology of a coupled sample.

BACKGROUND

Ever-increasing demands on the physical density of semiconductor devices have led to a trend of increasingly complex three-dimensional integrated circuit (3D IC) designs. The trend includes optimizing processes for dedicated functionalities (e.g., tailored to certain device types, such as 3D NAND and DRAM memory devices, logic CPU and GPU devices, I/O devices, and the like), manufacturing the types of devices on different samples, and then combining the samples to provide a single (3D-bonded) structure (e.g., via wafer-to-wafer (W2W) bonding, die-to-die (D2D) bonding, die-to-wafer (D2W) bonding, and the like).

One approach to achieving 3D IC designs is to fabricate structures on two separate samples and bond them together with interconnects near the interface. This technique may facilitate the integration of complex structures since the two samples may be fabricated separately and bonded in a subsequent process. For example, such combining may be temporary or permanent. Further, such combining may be collective or direct. For instance, collective D2W (Co-D2W) combining may involve bonding of multiple dies in a single placement operation. Direct combining may involve pick-and-place of individual dies sequentially. Combining more and more dies (e.g., 5, 10, 100s) of different functionalities on a single bonded sample is an increasing trend in the industry.

This trend is also driven by a desire to overcome communication bottlenecks between different areas of the samples and between different functionalities by creating dense interconnects between the bonded samples. These dense interconnects may require tight overlay alignment tolerances.

Several challenges face metrology of overlay between two samples such as may be performed for alignment purposes. Generally, samples that are to be bonded to another sample are either cut from a wafer or individually bonded. For example, samples may be cut from a wafer such as in a D2W bonding process and individually picked-and-placed or collectively coupled such as being pre-aligned on a glass or silicon (Si) substrate and placed simultaneously, or bonded pre-cutting such as in a W2W bonding process. There are tradeoffs and various techniques used for each type of process.

Generally, W2W bonding is limited in accuracy of alignment of structures because structures vary more from one end to the other of the wafer compared to smaller samples (e.g., dies). However, W2W allows for using non-functional space (e.g., scribe line area) for alignment purposes. For example, techniques for W2W bonding may use dedicated "see-through" holes in the scribe line areas of the wafer to aide in alignment. Another technique for W2W bonding uses an etching process to carefully etch away a deep recess into the wafer such that a thin, more translucent spot is created to be used for alignment purposes. However, such a technique is destructive, time consuming, and takes up space.

The W2W bonding may also limit the end product yield due to use of defective or nonfunctional dies in either one of the bonded wafers.

On the other hand, D2W bonding may allow for tighter alignment of interconnects due to less variability across the die but historically uses dedicated nonfunctional overlay targets in the active area (e.g., electrically functional area such as area used by logic gates and transistors). Using the active area for alignment is usually required because dies are already cut from the wafer and thus do not generally have scribe line areas for alignment purposes. However, directly measuring the alignment of structures in the active area at the interface between the bonded samples from the outside is impractical because the samples are not necessarily transparent enough for optical microscopy or scatterometry overlay techniques.

It is noted that many factors may decrease the likelihood that a structure buried deep at the interface formed between the two mated samples is going to be measurable for overlay purposes. For example, factors reducing measurability may include, but are not limited to, increased thickness of a sample, increased doping of sample material, opaque metallic layers, density of structures, and the like. Generally, the likelihood that one or more of these factors will limit measurability increases as designs become more complex and use more layers.

Some techniques for aligning dies in a D2W bonding process use relatively large (e.g., 30 micrometer (um) width) dedicated (e.g., electrically-nonfunctional) overlay targets in the active area of the sample. Measuring these overlay targets may require the lack of obstructing features above and/or below the overlay targets, creating a non-functional column-shaped volume along a depth direction of the sample and taking up valuable active area. Further, as the thickness of a sample increases with more layers, the additional layers must also reserve space for measuring the dedicated stack of overlay targets.

Other obstacles to measuring (e.g., imaging) structures at the bonding interface may include poor optical properties (e.g., low transparency) of an adhesive material layer used in wafer carrier bonding. Additional obstacles for bonding alignment generally may include tight overlay specification tolerances and increasing density of interconnects as the interconnects scale down in size.

Therefore, there exists a desire for accurately determining alignment of a sample (e.g., die) for coupling (e.g., bonding) to cure the above deficiencies.

SUMMARY

A metrology system is disclosed, in accordance with one or more embodiments of the present disclosure. In one illustrative embodiment, the metrology system includes a metrology sub-system configured to acquire an overlay measurement for an interface target on a coupled sample. In one illustrative embodiment, the metrology sub-system includes a controller communicatively coupled to the metrology sub-system. In another illustrative embodiment, the controller includes one or more processors and may include memory. In another illustrative embodiment, the one or more processors are configured to execute a set of program instructions stored on the memory. In another illustrative embodiment, the one or more processors are configured to execute program instructions causing the one or more processors to determine, on a first sample prior to coupling with a second sample to form a coupled sample, a first registration measurement between a first interface target structure and a first registration structure located on a different layer than the first interface target structure, where the first registration structure is configured to be measured by the metrology sub-system through a top face of the first sample opposite the couplable face of the first sample. In another illustrative embodiment, the one or more processors are configured to execute program instructions causing the one or more processors to determine, on the second sample prior to the coupling with the first sample to form the coupled sample, a second registration measurement between a second interface target structure and a second registration structure, where the second registration structure is configured to be unobstructed by the first sample when the first sample is coupled to the second sample to form the coupled sample. In another illustrative embodiment, the one or more processors are configured to execute program instructions causing the one or more processors to determine, on the coupled sample after the first sample is coupled to the second sample, a third registration measurement between the second registration structure on the second sample and the first registration structure on the first sample at least in part by measuring the first registration structure through a top face of the first sample. In another illustrative embodiment, the one or more processors are configured to execute program instructions causing the one or more processors to acquire the overlay measurement for the interface target based on the first registration measurement, the second registration measurement, and the third registration measurement.

A method is disclosed, in accordance with one or more embodiments of the present disclosure. In one illustrative embodiment, the method may include, but is not limited to, determining, via a metrology sub-system, a first registration measurement between a first interface target structure and a first registration structure of a first sample prior to a coupling of the first sample to a second sample to form a coupled sample. In one illustrative embodiment, the method may include determining, via the metrology sub-system, a second registration measurement between the second interface target structure and a second registration structure of the second sample prior to the coupling of the first sample to the second sample to form the coupled sample.

In one illustrative embodiment, the method may include coupling the first sample to the second sample to form the coupled sample. In one illustrative embodiment, the method may include determining, via the metrology sub-system, on the coupled sample after the first sample is coupled to the second sample, a third registration measurement between the second registration structure on the second sample and the first registration structure on the first sample at least in part by measuring the first registration structure through a top face of the first sample. In one illustrative embodiment, the method may include acquiring an overlay measurement for the interface target based on the first registration measurement, the second registration measurement, and the third registration measurement.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

FIG. 2B is a side view of the first sample of FIG. 2A, in accordance with one or more embodiments of the present disclosure.

FIG. 3 is a flow diagram illustrating steps performed in a method for acquiring overlay measurements of coupled samples, in accordance with one or more embodiments of the present disclosure.

Figure 6A:
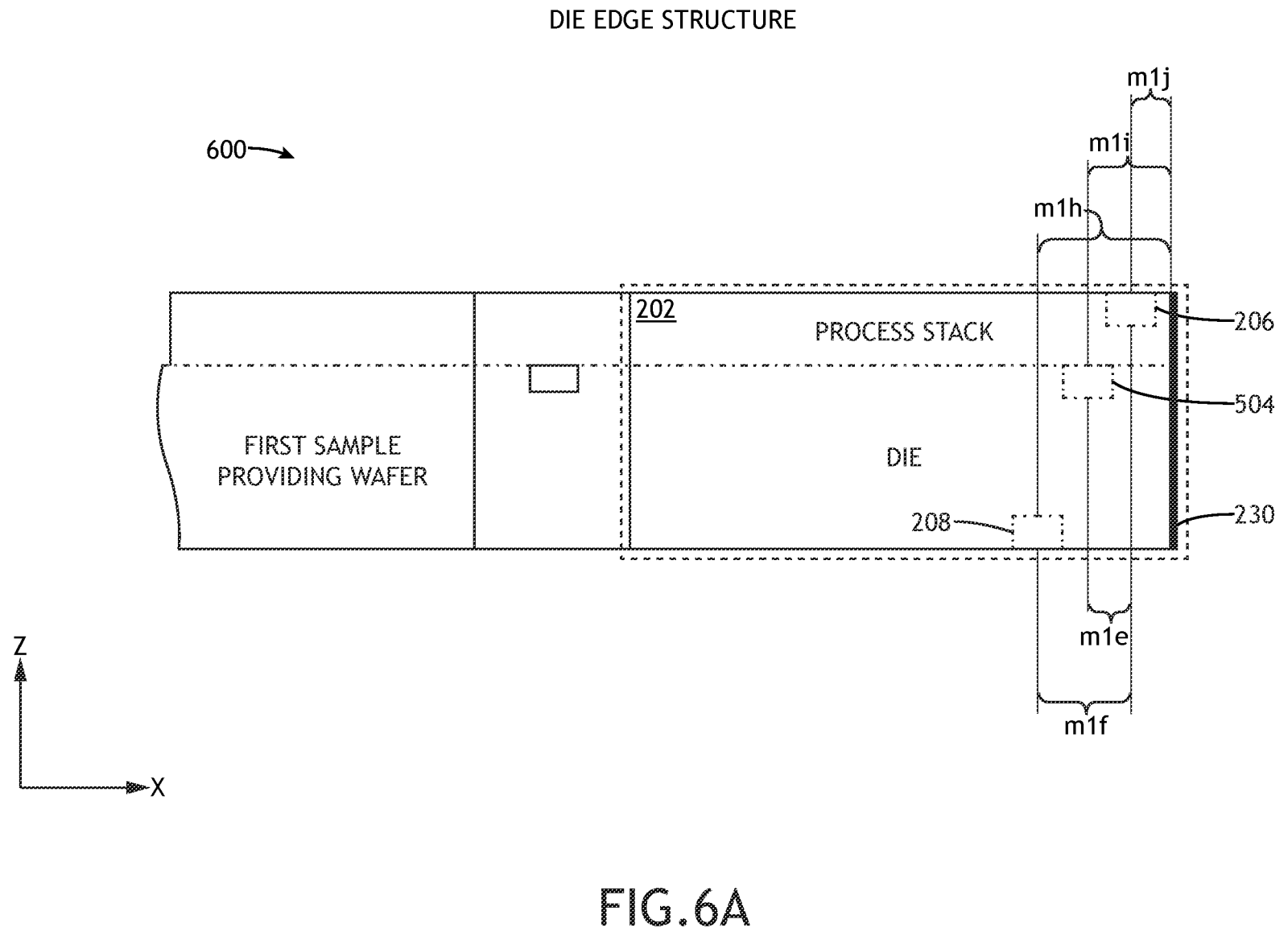

FIG. 6A is a side view of a first sample before being cut from a wafer, in accordance with one or more embodiments of the present disclosure.

DETAILED DESCRIPTION

Figure 1:
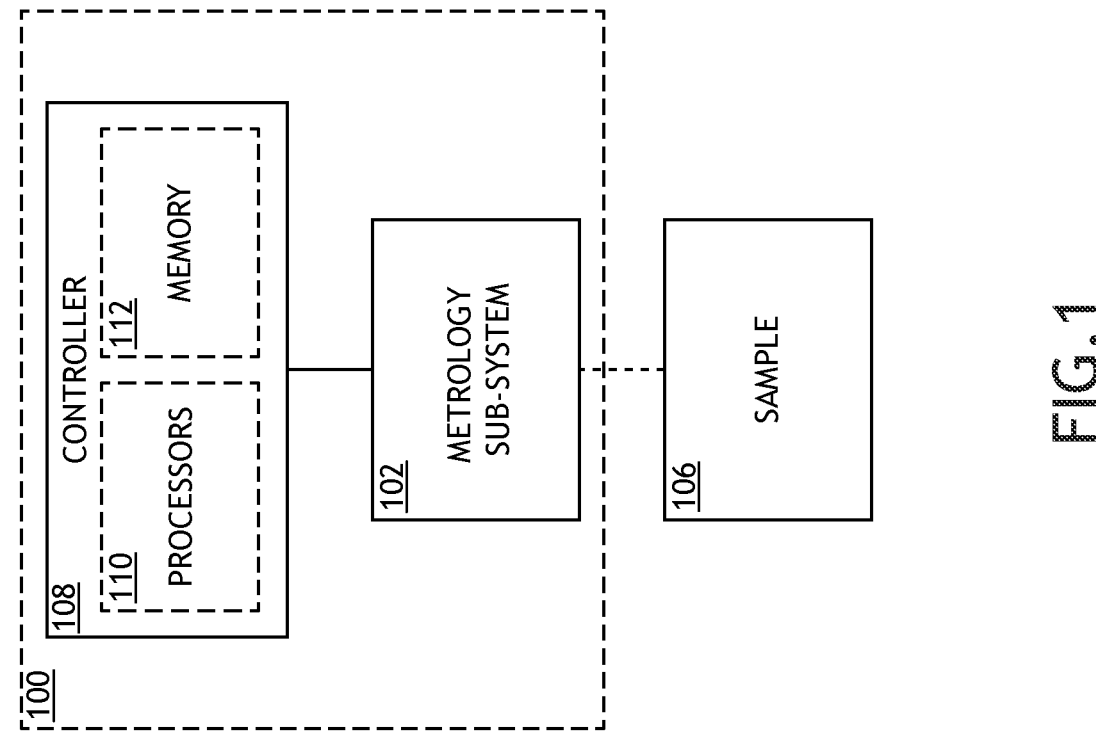
FIG. 1 is a conceptual view illustrating a metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for measuring overlay of a structure by combining registration measurements of various reference structures relative to that structure. For example, the measured structure may include a structure at an interface between two mated samples. The interface may be defined as being formed by a face of each sample when placed against each other. One challenge that exists with measuring overlay of structures at or near the interface is that following the coupling of one sample to another, such interface structures are deep within the coupled sample and the cumulative thickness of layers above such structures may lack adequate transparency to allow for measuring the structures.

For purposes of the present disclosure, the term "imaging" and the like is not necessarily meant to be limiting to optical techniques, is used for purposes of brevity, and generally is interchangeable with the term "measuring." Measuring includes any type of signal collection that supports the acquisition of registration or overlay measurements. For example, such collection of signals includes scatterometry based techniques and imaging in visible, infrared, and x-ray (tomography) wavelengths. Further, such collection includes scanning electron microscope (SEM) based techniques.

While directly measuring structures at the interface through a top face of a sample may generally be impractical, it is contemplated that measurements of the structures at the interface may be provided for by mathematically combining other measurements. In embodiments, multiple registration measurements acquired before a coupling operation may be stored and sent with the sample to the coupling operation. Such pre-coupling measurements may be combined with one or more post-coupling measurements to mathematically calculate a measurement of a structure at the interface of the coupled sample. In this regard, a measurement of a structure buried within a coupled sample that is impractical to image after being coupled may still be determined by combining various other measurements acquired before and after the coupling. Benefits of embodiments include aiding in proper alignment of samples before a permanent bonding process and increasing the likelihood of properly functioning interconnected devices.

For purposes of the present disclosure, a top face means a face opposite a couplable face, a "backside" face of the first manufactured layer of a sample, and/or the like.

Embodiments of the present disclosure, before the sample is mated to another sample, track registration measurements between the structure at the interface and a buried structure in a lower earlier-manufactured layer. Therefore, when the sample is turned over, the buried structure is closer to the top/outer surface and more easily imaged/measured. In addition, since a registration measurement is known between the buried structure and the structure at the interface (e.g., bonding interface), a measurement to the buried structure may be combined with the registration measurement to mathematically determine a location, and thus overlay, of the structure at the interface. In this regard, the overlay of the structure at the interface may be indirectly determined, even when the structure at the interface is not directly imageable. In additional embodiments of the present disclosure, registration measurements to the structure at the interface are tracked relative to an edge of the sample. In this regard, even when the sample is turned over for bonding and the structure at the interface is not directly imageable, a measurement to the edge may be used to mathematically determine a location, and thus overlay, of the structure at the interface. In additional embodiments of the present disclosure, registration measurements to the structure at the interface are tracked relative to intermediary structures in intermediary layers of the sample. In this regard, even when the sample is turned over for bonding and the structure at the interface is not directly imageable, a measurement to an intermediary structure may be used to mathematically determine a location, and thus overlay, of the structure at the interface.

Moreover, while various components may be described or depicted as being "coupled" or "connected", any two components capable of being so associated can also be viewed as being "couplable," to each other to achieve the desired functionality. Specific examples of couplable include but are not limited to physically mateable, and/or physically interactable components. Also, while various components may be depicted as being connected or coupled directly, direct connection or direct coupling is not a requirement. For example, components may be indirectly coupled (e.g., couplable) through some interface, device, layer (e.g., adhesive), or intermediate component whether physically (e.g., physically mated) or otherwise.

For the purposes of the present disclosure, the terms "couple", "coupled", "coupling", "coupling process", and the like do not necessarily mean bonded, fused, or permanently attached, and may also mean temporarily coupled. For example, the term "coupled" may simply mean samples that are aligned and placed (e.g., temporarily and nondestructively reversibly placed) relative to each other. For example, in embodiments, even after a coupling step, a first sample may be nondestructively decoupled from a second sample. For example, "coupled" may mean lightly clamped together using clamping components. For example, a different permanent bonding step may take place at a later time that includes applying heat and pressure to fuse material of the first sample to the second sample. However, coupling or being coupled may mean a permanent bonding process or being permanently bonded using heat and pressure to fuse samples and which either can't easily or nondestructively be reversed and/or requires a heating process to melt material and de-bond the samples.

For the purposes of the present disclosure, the terms "structure", "feature", and the like may generally be any structure to which a measurement may be taken of. For example, a structure generally could be, but is not limited to, an electrically functional structure such as a portion of a logic gate or transistor, a nonfunctional structure such as a dedicated overlay target, an edge of a die/wafer, or any other measurable structure. Accordingly, it is to be understood that examples of structure in the present disclosure are provided solely for illustrative purposes and should not be interpreted as limiting.

For the purposes of the present disclosure, the term "registration measurement", and the like may mean a measurement between two structures. For example, a registration measurement may mean a distance between two structures as projected onto two planes along a direction (e.g., X-direction, Y-direction). For example, such a direction may be orthogonal to a depth direction through layers of a sample. In this regard, a registration measurement may be the projected "X component" of a vector between two structures. For example, a registration measurement may be based on a single image where both structures are within the field of view of the image and a distance between structures in the image may be used to derive the registration measurement between the structures. In another example, a registration measurement is acquired as follows: first, imaging a position of a respective structure; then, moving the sample relative to the metrology sub-system by a precisely known distance; and finally, imaging a different structure. The positions (e.g., center positions) of the structures in the images and the known distance the sample was moved may be used to acquire the registration measurement between the structures. In another example, registration measurements may be mathematically determined between three or more structures using two or more registration measurements. For instance, the X components of a registration measurement between a first and second structure, and a registration measurement between the second structure and a third structure may be combined to determine the X component registration measurement between the first and third structure. It should be noted that examples of registration measurements in the present disclosure are provided for illustrative purposes and should not be interpreted as limiting, and any number of registration measurements (whether based on other registration measurements or not) to any number and type of structures may be combined to determine registration measurements between various structures.

Referring now to FIGS. 1 through 6B, systems and methods for acquiring an overlay measurement of a coupled sample (e.g., coupled sample 200 of FIG. 2A) are described, in accordance with one or more embodiments of the present disclosure. In embodiments, the systems and methods may be used to augment existing systems and methods of metrology (e.g., overlay metrology) and/or inspection of samples.

FIG. 1 illustrates a conceptual view of a metrology system 100, in accordance with one or more embodiments of the present disclosure.

In embodiments, the metrology system 100 includes a metrology sub-system 102. The metrology system 100 may generally include any number or type of metrology sub-systems 102 and each metrology sub-system 102 may generally include any number or type of sub-systems (e.g., metrology and/or inspection sub-systems).

In embodiments, a sample 106 may include any number and type of samples known in the art. For example, the sample 106 may be a pre-bonded substrate (e.g., pre-bonded die), a coupled sample formed from two substrates (e.g., die to wafer, wafer to wafer, die to die, and the like), a pre-diced wafer, or any other type or combination of samples. For instance, the sample 106 may include a coupled sample formed from two substrates coupled together at an interface. Further, the sample 106 may be formed from any material or combination of materials including, but not limited to, a semiconductor, a metal, a polymer, a glass, or a crystalline material. In embodiments, at least one sample 106 includes a wafer (e.g., a semiconductor wafer). In embodiments, a sample 106 may include a coupled sample. For instance, a coupled sample may include, but is not limited to, a wafer sample and a die sample coupled at an interface. In this regard, a sample 106 such as a coupled sample may include two or more samples 106 coupled together. Note that, while a sample 106 may be described in terms of being a "die", such a term is nonlimiting and any descriptions and methodologies herein may be applicable to a "chiplet", a "chip", multiple dies/chiplets collectively coupled in-plane together, a full wafer, a partially diced wafer, a plurality of multiple stacked bonded dies/chiplets/wafers configured to be bonded to another wafer, and the like.

In embodiments, the metrology system 100 includes a controller 108. The controller 108 may include one or more processors 110 configured to execute program instructions maintained on memory 112 (e.g., a memory medium). Further, the controller 108 may be communicatively coupled with any of the components of the metrology system 100 including, but not limited to, the metrology sub-system 102 and any other sub-systems. In this regard, the one or more processors 110 of controller 108 may execute any of the various process steps described throughout the present disclosure.

Figure 2A:
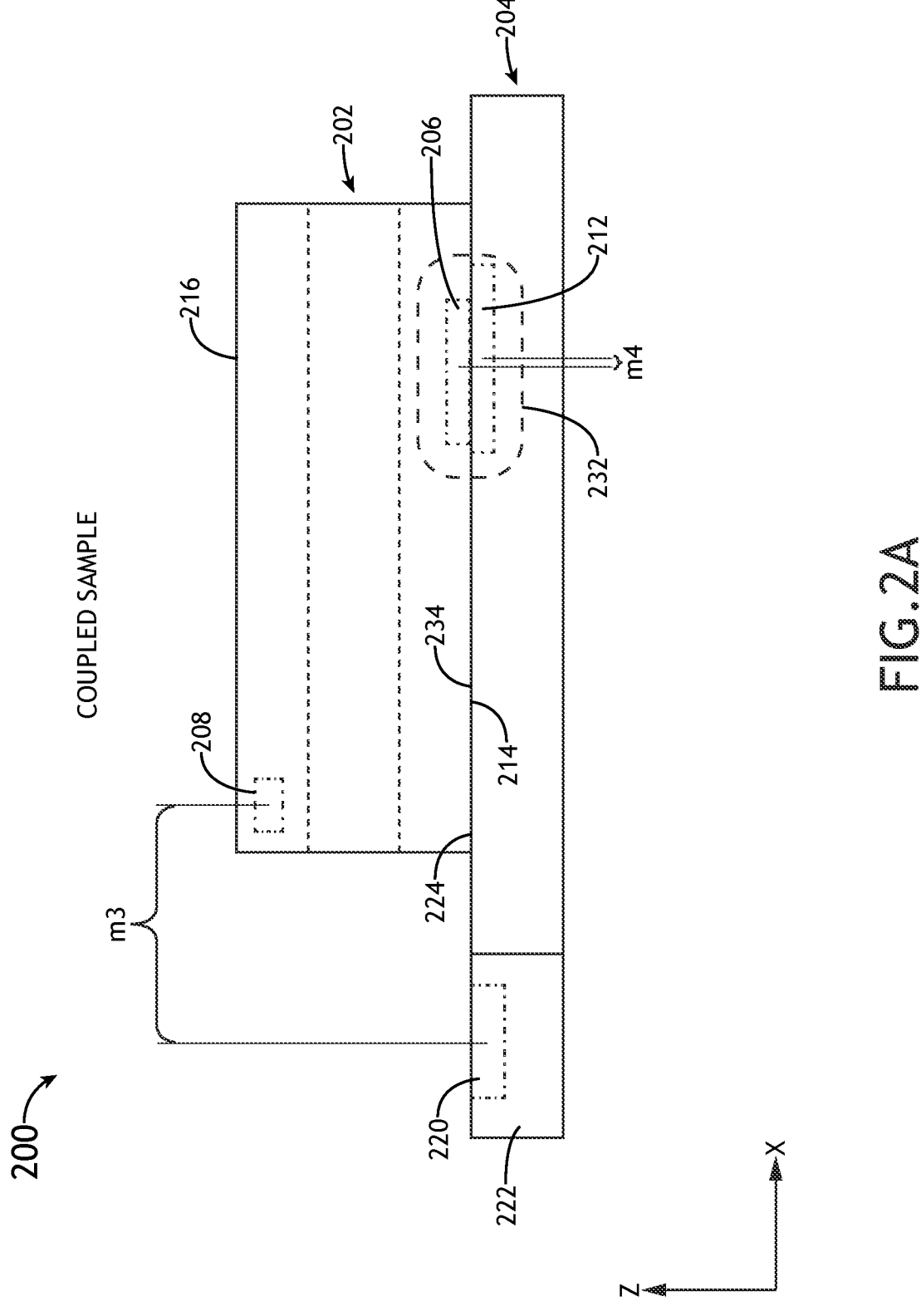
FIG. 2A is a side view of a coupled sample including a first sample coupled to a second sample, in accordance with one or more embodiments of the present disclosure.

FIG. 2A illustrates a side view of a coupled sample 200 including a first sample 202 coupled to a second sample 204, in accordance with one or more embodiments of the present disclosure. In embodiments, the first sample 202 includes a couplable face 214 opposite the top face 216. In embodiments, the first sample 202 includes various structures such as, but not limited to, a first interface target structure 206 at or near the interface 224. A challenge of measuring coupled samples 200 is that structures at or near the interface 224 are often impractical to measure through the top face 216. Therefore, it may be impractical to measure the alignment of interconnecting interface structures of two samples that are coupled together.

For the purposes of the present disclosure, the term "at the interface" may be interpreted to encompass structures that are located at an interface, near an interface, and/or through an interface.

Figure 2C:
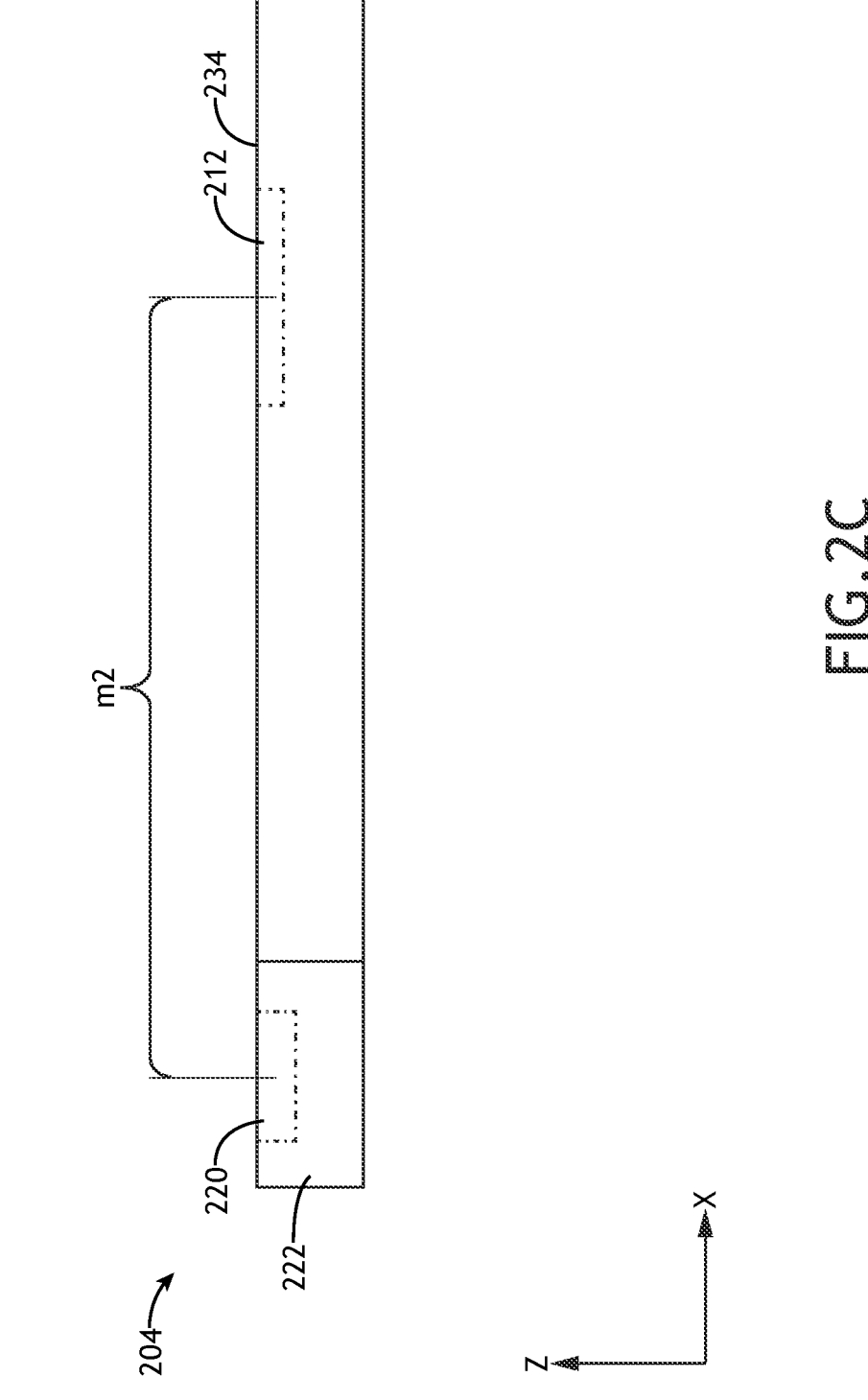
FIG. 2C is a side view of the second sample of FIG. 2A, in accordance with one or more embodiments of the present disclosure.

FIG. 2B illustrates a side view of a first sample 202 and a first registration measurement m1, and FIG. 2C illustrates a side view of a second sample 204 and a second registration measurement m2, in accordance with one or more embodiments of the present disclosure. For example, first registration measurement m1 and second registration measurement m2 may be acquired before the first sample 202 is coupled to the second sample 204. Registration measurements m1, m2 are examples of registration measurements that may be mathematically combined to acquire overlay measurement m4 of FIG. 2A. For example, overlay measurement m4 of structures 206, 212 may be mathematically determined by combining registration measurements m1, m2, and m3, even when the structures 206, 212 at the interface are not directly imageable (e.g., measurable through the top face 216 of the first sample 202). For instance, mathematically combining may mean vector addition and/or subtraction of measurements.

For purposes of the present disclosure, the term "overlay measurement" and the like includes the measurable error in alignment of a center of symmetry of structures (e.g., structures 206, 212).

In embodiments, acquiring an overlay measurement m4 of structures at the interface 224 may be provided for (e.g., calculated) by mathematically combining other measurements. For example, a first interface target structure 206 may be a structure that is more practical to be measured/imaged through the top face 216. Further, a measurement m3 to the first interface target structure 206 may be acquired following a coupling of samples 202, 204. In addition, measurements acquired prior to the coupling of samples 202, 204 may be combined with measurement m3. For instance, in embodiments, measurement m1 of FIG. 2B and measurement m2 of FIG. 2C are examples of measurements acquired prior to the coupling of samples 202, 204.

FIG. 3 illustrates a flow diagram of steps performed in a method 300 for acquiring an overlay measurement m4 of a coupled sample 200, in accordance with one or more embodiments of the present disclosure.

In a step 302, referring back to FIG. 2B, a first registration measurement m1 between a first interface target structure 206 and a first registration structure 208 of a first sample 202 is determined.

In embodiments, step 302 may be performed by any metrology tool known in the art. For example, step 302 may be performed using an optical metrology sub-system of the metrology sub-system 102 or an electron beam metrology sub-system (e.g., scanning electron microscope metrology sub-system or the like) of the metrology sub-system 102.

In embodiments, step 302 may be performed at any step of a fabrication process. For example, step 302 may be performed at one or more after-develop inspection (ADI) steps of one or more layers (e.g., layers 218, 226, 228) of the first sample 202. For example, step 302 may be performed at one or more after-etch inspection (AEI) steps of one or more layers of the first sample 202.

In embodiments, step 302 is performed prior to a coupling of the first sample 202 to a second sample 204 to form a coupled sample. For example, step 302 may be performed before coupling step 306. In this regard, step 302 may be performed from a "frontside" (e.g., facing a negative Z-direction as shown in FIG. 2B) relative to the first sample 202 before the first sample 202 is turned over for coupling. This may allow for measuring in-line (e.g., during the manufacturing of layers of the first sample 202).

In embodiments, an interface target (e.g., interface target 232 of FIG. 2A) includes the first interface target structure 206 associated with a couplable face 214 of the first sample 202 and a second interface target structure 212 associated with a couplable face 234 of the second sample 204. For example, the first interface target structure 206 and the second interface target structure 212 may be located at or proximate to an interface 224 when the first sample 202 is coupled to the second sample 204. For example, in embodiments, first interface target structure 206 is configured to be a portion of an interface target 232 of which an overlay measurement m4 is acquired. For instance, interface target 232 may include or be an AIM overlay target, a box-in-box (BiB) overlay target, a side-by-side overlay target, and the like. However, such descriptions and examples are nonlimiting and the interface target 232 may include any structure, such as electrically-functional interconnect elements (e.g., through-silicon-vias (TSVs), other interconnect structures, logic gates, transistors, and the like).

In embodiments, the couplable face 214 is a face with interconnects configured to be coupled to a second sample. In embodiments, the couplable face 214 is the face most recently manufactured in a first sample 202 manufacturing process. For instance, the opposite side of the first sample 202 may include a top face 216.

In embodiments, the first sample 202 may include any number (e.g., 2, 3, 10, 100s) of layers. For example, first sample 202 may include a first layer 218, one or more intermediary layers 226, and a couplable layer 228. In embodiments, first interface target structure 206 may, but is not limited to, be located in the couplable layer 228. For example, first interface target structure 206 may be at and/or proximate to the couplable face 214 of the first sample 202. In other embodiments first interface target structure 206 may be in other layers, such as a layer impractical to image through the top face 216 for registration measurement purposes. For example, such a layer may be an intermediary layer 226 near the couplable layer 228.

Figure 4A:
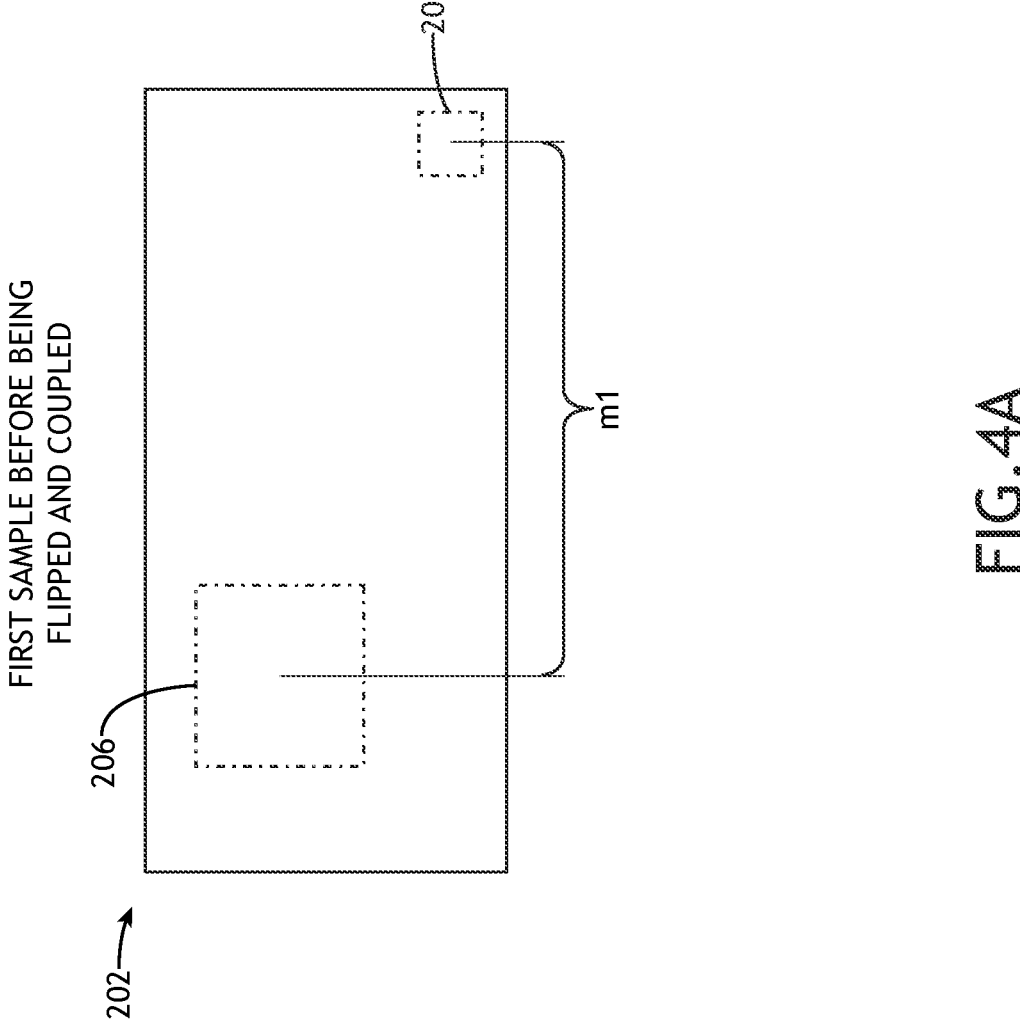
FIG. 4A is a top view of the first sample of FIG. 2B, in accordance with one or more embodiments of the present disclosure.
Figure 4B:
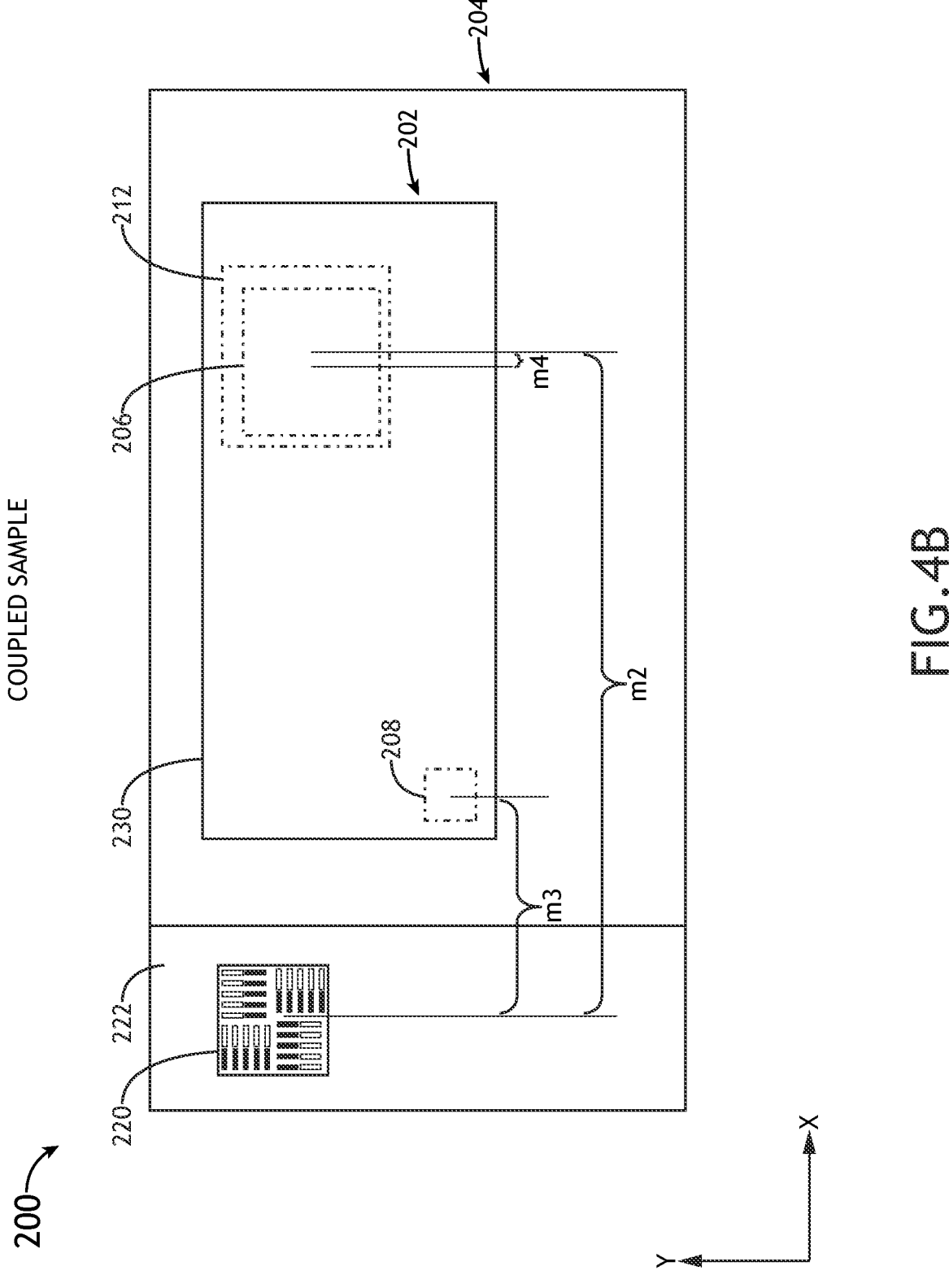
FIG. 4B is a top view of the coupled sample of FIG. 2A, in accordance with one or more embodiments of the present disclosure.

In a step 304, referring back to FIG. 2C, a second registration measurement m2 between the second interface target structure 212 and a second registration structure 220 of a second sample 204 is determined. For example, nonlimiting examples of second registration measurements m2 are shown in FIGS. 2C, 4B, 5B, and 6B. Further, a nonlimiting example of a second registration structure 220 is a scribe line structure as shown in FIGS. 2A, 5B, and 6B.

In embodiments, step 304 may be performed by any metrology tool known in the art such as, but not limited to, an optical metrology sub-system of the metrology sub-system 102 or an electron beam metrology sub-system (e.g., scanning electron microscope metrology sub-system or the like) of the metrology sub-system 102. For example, step 304 may be performed via one or more optical metrology sub-systems 102 in the visible spectral range of light. For instance, the determining the second registration measurement m2 of step 304 may include imaging both the second interface target structure 212 and the second registration structure 220 via an optical metrology sub-system of the metrology sub-system 102 in a visible spectral range of light.

In embodiments, step 304 of determining the second registration measurement m2 is performed using any of a variety of techniques for acquiring measurements. For example, the second registration measurement m2 may be based on a single image where both structures 212, 220 are within the field of view of the image and a distance between those structures 212, 220 in the image may be used to derive the second registration measurement m2. In another example, the second registration measurement m2 is acquired as follows: first, measuring a position of a first structure (e.g., one of the structures 212, 220); then, moving the second sample relative to the metrology sub-system 102 by a precisely known distance using a sample translation stage (e.g., actuators, electric motors, and/or the like configured to move a sample in the X-Y plane); and finally, imaging the other structure (e.g., structure 220 or structure 212). In another example, instead of moving the sample 204, the second registration measurement m2 is determined by deflecting light from the second interface target structure 212 to the second registration structure 220 via a movement of one or more optical elements (e.g., mirrors, lenses, and the like) of the metrology sub-system 102. For instance, the amount of movement (e.g., rotation, translation) of a mirror configured to deflect illumination from a first field of view (FOV) to a second FOV may be used to calculate the relative distance between a structure 212, 220 in each FOV.

In embodiments, step 304 is performed prior to a coupling of the first sample 202 to a second sample 204 to form a coupled sample, such as before coupling step 306. In this regard, step 304 may be used to obtain a registration measurement m2 of second interface target structure 212 before the second interface target structure 212 is obstructed by being covered by the first sample 202 in a coupling step.

In embodiments, the second registration structure 220 is configured to be unobstructed by the first sample 202 when the first sample 202 is coupled to the second sample 204 to form the coupled sample. For example, the second registration structure 220 may be located in the scribe line area 222 such that the second registration structure 220 is not blocked by other elements when viewed in the negative Z-direction. For example, the scribe line area 222 may be an area designated to be cut so that individual dies of the second sample 204 may be separated/diced. For example, being unobstructed, being viewable, and the like may mean unobstructed for purposes of allowing for a third registration measurement (e.g., measurement m3 of FIG. 2A) between the second registration structure 220 on the second sample 204 and a different structure (e.g., the first registration structure 208).

In embodiments, the second registration structure 220 is a target. For example, the second registration structure 220 may be an overlay target having periodically repeated gratings such as, but not limited to, an AIM overlay target, a box-in-box (BiB) overlay target, and the like. For example, the second registration structure 220 may be imageable using optical metrology sub-systems configured to image in the visible spectral range of light. In other examples, the second registration structure 220 may be a scanning electron microscope (SEM) target having a size (e.g., smaller than 4 um in width) and being measurable using an SEM metrology sub-system.

In a step 306, referring back to FIG. 2A, the first sample 202 is coupled to the second sample 204 (e.g., carrier wafer) to form a coupled sample 200. In embodiments, such a coupling may be a temporary or permanent coupling. For example, the coupled sample 200 may be temporarily coupled (e.g., lightly clamped) for alignment purposes. For instance, step 306 may be an intermediate coupling, and not a final bonding. In another example, the coupled sample 200 includes (or is) a bonded sample such that the first sample 202 is fused to the second sample 204. For instance, the coupling of step 306 may be a fusing (i.e., bonding) using heat and pressure.

In embodiments, step 306 is a temporary coupling for alignment purposes and, in a later optional bonding step, the first sample 202 is fused to the second sample 204 to form a bonded sample. For example, the optional bonding step may occur before or after the acquiring of overlay measurement m4. One benefit of the optional bonding step occurring after the overlay measurement m4 is acquired is that the overlay measurement m4 may be utilized to adjust for, and reduce, the overlay between the first sample 202 and the second sample 204. For example, the first sample may be lifted and replaced in a new position or slid to a new position based on the overlay measurement m4, thereby achieving more strict alignment tolerances.

In embodiments, the direction of measurement (e.g., imaging) of a sample 106 (e.g., first sample 202) may be reversed/flipped/turned over. In this regard, the sample 106 may be imaged from both sides such as, first, from the side/face to be bonded and, later, from the opposite side (e.g., backside) after the samples are mated and the interface between the samples is non-imageable. For example, before or during the coupling step 306, the first sample 202 may be turned over so that the first sample 202 may be imaged from the opposite side/direction. For instance, the couplable face 214 may be facing in a positive Z-direction (e.g., the top face 216 mated to the couplable face 234) and then turned over to face a negative Z-direction (e.g., the couplable face 214 mated to the couplable face 234). For example, the couplable face 214 may be facing upwards during manufacturing and then turned over (upside down) to be coupled with the second sample 204. However, note that such an example is illustrative and nonlimiting and the direction of measurement of a sample 106 may be reversed/flipped in a variety of ways. In another example, a rotation of the sample 106 may stay unchanged but the metrology sub-system 102 may be rotated/flipped from the topside facing downwards (i.e., negative Z-direction) to being below the sample facing upwards. In another example, a different metrology sub-system 102 facing in an opposite measurement direction than a first metrology sub-system 102 may be used so that the sample is between the two metrology sub-systems 102 and does not need to be rotated.

In a step 308, referring to FIG. 2A, a third registration measurement m3 between the second registration structure 220 and the first registration structure 208 is determined at least in part by imaging the first registration structure 208 through the top face 216 of the first sample 202. In embodiments, step 308 is performed after the first sample 202 is coupled to a second sample 204 to form a coupled sample 200. For example, step 308 may be performed after coupling step 306. Nonlimiting illustrative examples of a third registration measurement are labeled as m3 in FIGS. 2A, 4B and as m3c in FIGS. 5B, 6B.

In embodiments, step 308 is performed via the metrology sub-system 102. For example, step 308 may be performed via one or more metrology sub-systems 102 configured to operate in the infrared and/or visible spectral range of light. For instance, step 308 may be performed via a single metrology sub-system 102 configured to operate in both the infrared and visible spectral ranges of light. In this regard, although not required, the frontside (couplable-side) measurements of samples 202, 204 in steps 302 and 304 may be performed in visible light before coupling, and a "backside" measurement in step 308 may be performed in infrared in order to penetrate a portion of material and image a buried first registration structure 208. However, note that not all backside (post-coupling) measurements necessarily need be performed in infrared, such as measurement m3d of FIG. 6B to a first sample edge 230 which may be performed with visible light.

In embodiments, the first registration structure 208 may be in various locations. For example, the first registration structure 208 may be near the top face 216 such that a thickness and imageability of material between the first registration structure 208 and the metrology sub-system 102 is translucent enough to be imaged by the metrology sub-system 102 for registration measurement purposes. For example, an increase of doping of material may reduce imageability for a given thickness of material and may require the first registration structure 208 to be closer to the top face 216 for imaging purposes. Note that many other factors may affect the measurability of first registration structure 208 such as, but not limited to, opaque layers (e.g., opaque metallic layers), and/or density of structures such as interconnects.

In another example, the first registration structure 208 is located on a different layer than the first interface target structure 206. For instance, the first registration structure 208 may be located closer to the top face 216 of the first sample 202 than the first interface target structure 206, which may be closer to the couplable face 214.

In embodiments, a field of view may generally be any size. For example, the field of view of the metrology sub-system 102 may be sufficiently large to simultaneously image the second registration structure 220 and the first registration structure 208. For instance, such a field of view may be used to obtain the third registration measurement m3. For example, the second registration structure 220 and the first registration structure 208 may be imaged simultaneously in a single step, allowing for an absolute single registration measurement for determining overlay measurement between the first sample 202 and the second sample 204.

In a step 310, referring to FIG. 2A, an overlay measurement m4 for an interface target 232 based on a first registration measurement m1 in FIG. 2B, a second registration measurement m2 in FIG. 2C, and a third registration measurement m3 in FIG. 2A is acquired.

As a nonlimiting example as may be applicable to FIGS. 2A-2C, and FIGS. 4A-4B, overlay measurement m4 may be calculated as follows:

$$m4 = m2 - (m1 + m3) \qquad \text{(Eq. 1)}$$

which may alternately be written in reference to label numbers as follows:

$$m4 = 206\text{-to-}212 = 220\text{-to-}212 - (206\text{-to-}208 + 208\text{-to-}220) \qquad \text{(Eq. 2)}$$

It should be noted that the above example is not limiting, and generally any combination of measurements may be used to acquire measurements such as overlay measurement m4. For example, one or more of measurements m1, m2, and m3 may each be based on mathematical combinations of other registration measurements (e.g., measurements m1a, m1c, and the like).

In accordance with one or more embodiments, FIGS. 2A-2C may be better understood from alternate viewing angles. FIG. 4A illustrates a top view of the first sample 202 of FIG. 2A, in accordance with one or more embodiments of the present disclosure. FIG. 4B illustrates a top view of the coupled sample 200 of FIG. 2A, in accordance with one or more embodiments of the present disclosure. As shown, registration measurements m2, m3 and the like may be projected onto a direction (e.g., an X-direction) if the structures are not aligned in the Y-direction or the like. For example, an X-projection from (0,0,0) to an XYZ coordinate (2,4,6) is 2 and the Y-projection is 4.

It is noted that FIGS. 2A-2B, and 4A-4B are provided merely for illustrative purposes and the size, location, type, quantity, arrangement, and/or any other quality of elements (e.g., structures, layers, samples, measurements) therein are not to be interpreted as limiting. Rather, many other types of structures may be used for acquiring registration measurements. For example, in some embodiments, a structure in a scribe line area 506 of a providing wafer of a first sample 202 may be used. In another example, a die edge may be used. In an additional example, an intermediary structure in an intermediary layer of a sample may be used. Note that such examples are not necessarily mutually exclusive. For example, a method may utilize a combination of scribe line structures, die edges, first registration structures, and/or intermediary structures to acquire registration measurements that may be combined to acquire overlay measurement m4.

Figure 5A:
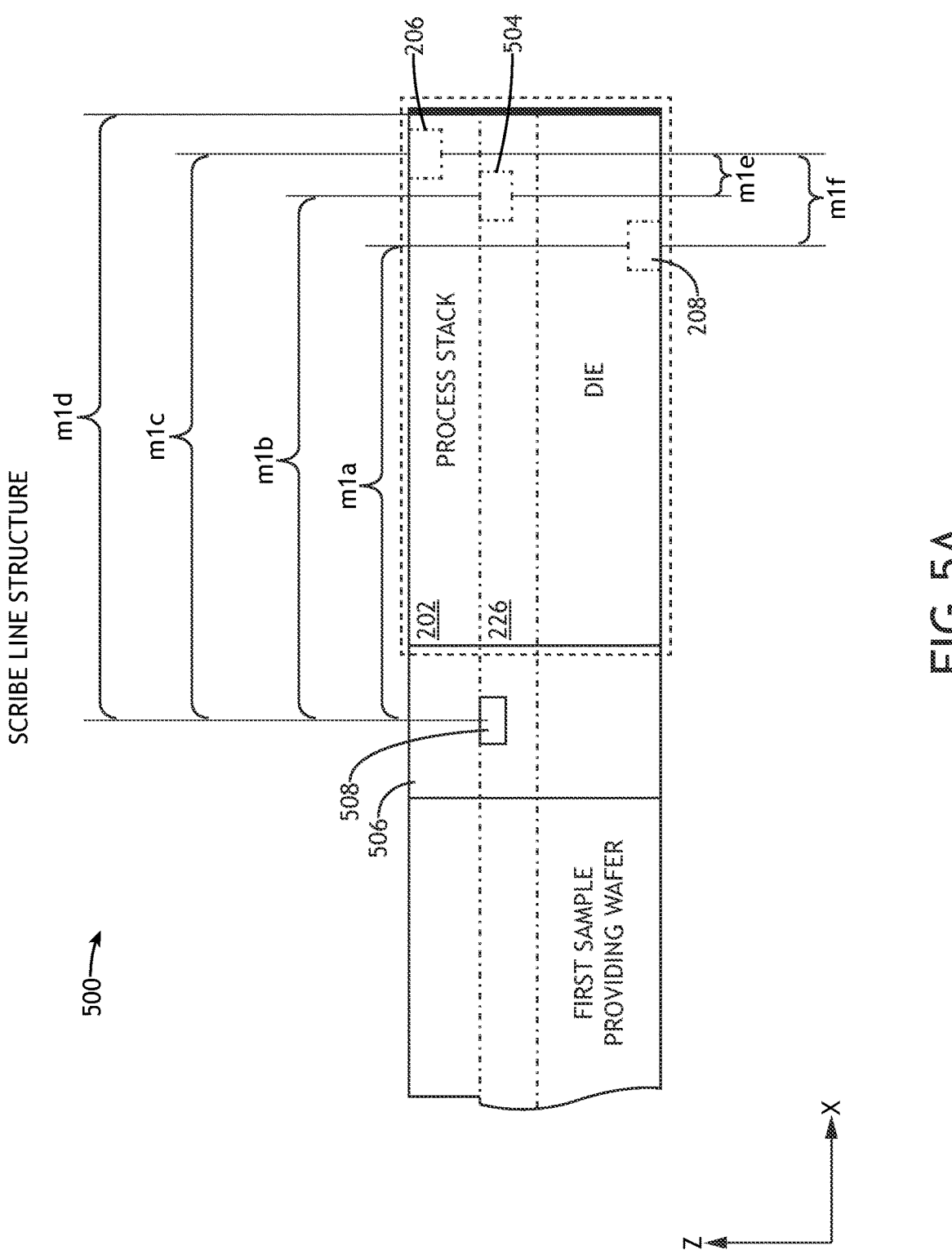
FIG. 5A is a side view of a first sample before being cut from a wafer, in accordance with one or more embodiments of the present disclosure.
Figure 5B:
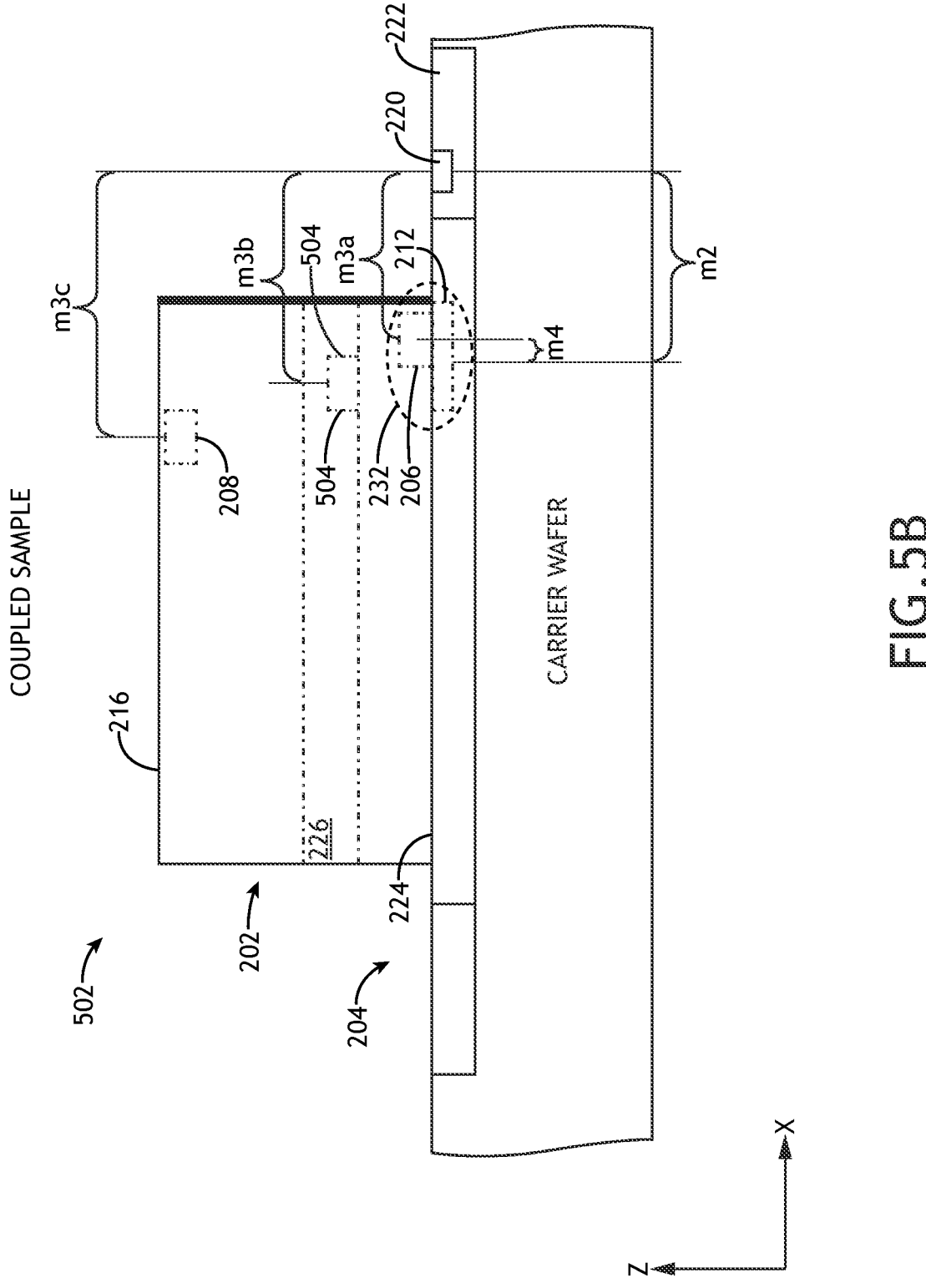
FIG. 5B is a side view of a coupled sample including the first sample of FIG. 5A after the first sample was cut from a wafer, in accordance with one or more embodiments of the present disclosure.
Figure 6B:
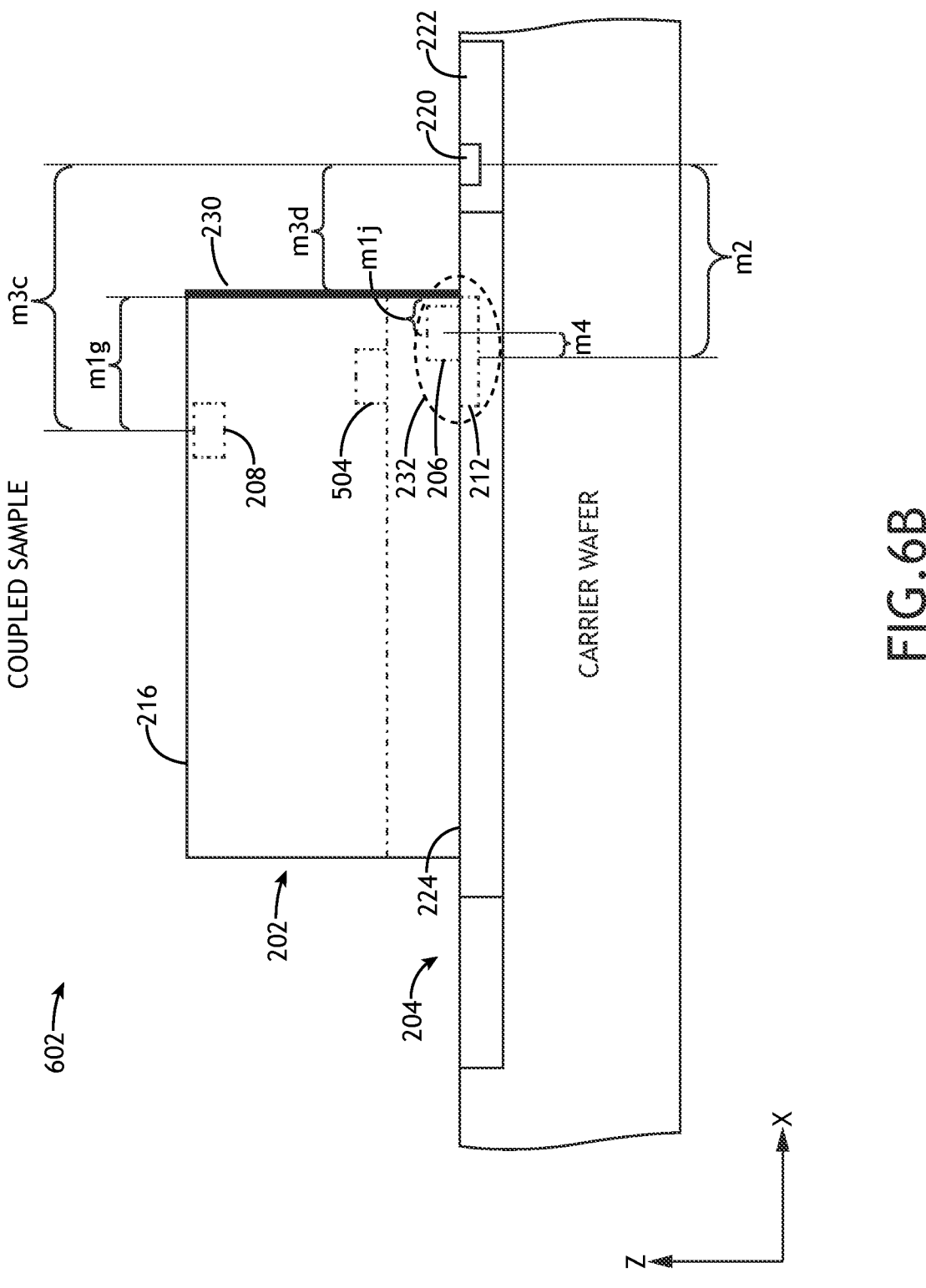
FIG. 6B is a side view of a coupled sample including the first sample of FIG. 6A after the first sample was cut from a wafer, in accordance with one or more embodiments of the present disclosure.

FIGS. 5A-5B illustrate an alternative example of acquiring an overlay measurement m4 using a first scribe line structure 508 associated with a first sample 202.

FIG. 5A illustrates a side view 500 of a first sample 202 before being cut from a wafer, in accordance with one or more embodiments of the present disclosure. In embodiments, the first sample 202 may be a die cut from a providing wafer as shown. A providing wafer may, for example, be a wafer used to produce dies and/or chiplets and a receiving wafer (i.e., base wafer) may be a wafer configured to receive the dies and/or chiplets during a coupling step. In embodiments, the first sample 202 may be proximate to a first scribe line structure 508 that is not necessarily part of the first sample 202, such as any structure of a providing wafer in the scribe line area 506. For example, first scribe line structure 508 may be one or more overlay targets in a scribe line area 506 of the providing wafer.

In embodiments, referring back to step 302, a first registration measurement may be based on a single measurement or be based on mathematically combining multiple measurements. For example, various registration measurements m1*a*, m1*b*, m1*c*, and/or the like may be combined to calculate first registration measurement m1*f* of FIG. 5A.

For instance, various registration measurements m1*a*, m1*b*, m1*c* may be between a first scribe line structure 508 or a stack of first scribe line structures 508 in various layers of the scribe line area. For example, a first scribe line structure 508 may be used throughout a manufacturing process (e.g., layer by layer) of the first sample 202 to keep track of registration measurements m1*a*, m1*b*, m1*c* of various structures 208, 504, 206 of the first sample 202. For instance, the first scribe line structure 508 may be in an intermediary layer 226 and unobscured such that the first scribe line structure 508 is measurable through multiple layers during the fabrication process. Next, such measurements m1*a*, m1*b*, m1*c* may be combined to determine the first registration measurement m1*f*. For example, referring back to FIG. 2B, first registration measurement m1 may alternatively be first registration measurement m1*f* of FIG. 5A and be mathematically based on registration measurements m1*a*, m1*b*, m1*c*, m1*d*, and the like to a first scribe line structure 508 of the first sample 202. For instance, first registration measurement m1*f* may be mathematically equal to registration measurement m1*c* minus registration measurement m1*a*.

FIG. 5B illustrates a side view 502 of a coupled sample including the first sample 202 of FIG. 5A, in accordance with one or more embodiments of the present disclosure. In embodiments, referring back to steps 302-310, variations of samples 202, 204 used in steps 302-310 are shown. For example, overlay measurement m4 may be calculated as follows:

$$m4=m2-m3a=m2-(m3c-m1f) \qquad \text{(Eq. 3)}$$

FIGS. 6A-6B illustrate an alternative example of acquiring an overlay measurement m4 using a first sample edge 230 associated with a first sample 202.

FIG. 6A illustrates a side view 600 of a first sample 202 with a first sample edge 230 (e.g., die edge), in accordance with one or more embodiments of the present disclosure. In embodiments, referring back to step 302, the first sample edge 230 may be utilized to determine the first registration measurement m1*f*. For example, first registration measurement m1*f* may be based on registration measurements m1*h*, m1*i*, m1*j*, and/or the like to a first sample edge 230. For instance, first registration measurement m1*f* may be mathematically equal to registration measurement m1*h* minus registration measurement m1*j*.

FIG. 6B illustrates a side view 602 of a coupled sample including the first sample 202 of FIG. 6A, in accordance with one or more embodiments of the present disclosure. In embodiments, referring back to steps 302-310, variations of samples 202, 204 used in steps 302-310 are shown. For example, overlay measurement m4 may be calculated as follows:

$$m4=m2-(m3d+m1j) \qquad \text{(Eq. 4)}$$

Alternatively:

$$m4=m2-(m3c-m1g+m1j) \qquad \text{(Eq. 5)}$$

Alternatively:

$$m4=m2-(m3c-m1f) \qquad \text{(Eq. 6)}$$

Referring back to FIGS. 5A and 5B, an alternative example of acquiring an overlay measurement m4 using one or more intermediary structures 504 in one or more intermediary layers 226 is illustrated. In embodiments, intermediary structures 504 are generally located within any layer at any location. For example, the intermediary structures 504 are not necessarily in every intermediary layer, but may, in some instances, appear in every few layers. For instance, in a 20-layer first sample 202, layers 6 and 11 may each have one or more intermediary structures 504 buried within. In embodiments, intermediary structures 504 may be used to keep track of overlay throughout a first sample 202. In this regard, registration and/or overlay measurements of the intermediary structures 504 may be used in a determination of the first registration measurement m1.

In embodiments, intermediary structures 504 are generally any type of structure such as, but not limited to, a function structure (e.g., feature of a transistor or logic gate) and/or a dedicated non-functional target. For example, intermediary structures 504 may be overlay targets. In another example, an intermediary structure 504 may be a functional device feature. For example, if an intermediary structure 504 is a functional device feature, then the space taken up by the intermediary structures may be more efficiently used for electrical functionality of the coupled sample and not wasted as a dedicated overlay target. In some examples, at least one of the one or more intermediary structures 504 are overlay targets. For example, some layers may not have functional structures that are easily measured and may need at least one dedicated overlay target. For example, the intermediary structures 504 may be SEM targets configured to be imaged by an SEM metrology sub-system 102. For example, such SEM targets may be targets smaller than 3 or 4 um in width and length as measured within a plane normal to a depth direction of the first sample. It should also be noted that the first registration structure 208, in embodiments, may include such an SEM target of such a size.

For purposes of the present disclosure, "overlay" generally means an error between an intended pattern or structure placement and the actual pattern or structure placement. For example, overlay may mean errors such as a lateral shift, rotation, magnification, and/or combination of such errors of a placement of an overlay target or a pattern of devices.

In embodiments, various types of measurements may generally be based on intermediary structures 504. For example, the types of measurements may include direct overlay measurements and registration overlay measurements between two or more structures. For instance, direct overlay measurements may mean measuring between a structure in a layer immediately above, and adjacent or overlapping to a structure in a lower layer. In this regard, intermediary structures 504 may include functional structures (e.g., features of logic gates) in different layers that happen to be adjacent or overlapping when viewed along a depth direction. Moreover, intermediary structures 504 may include overlapping or adjacent overlay targets commonly used to acquire direct overlay measurements. Overlay registration measurements may mean measuring overlay of structures in different layers that are not overlapping and are spaced apart a distance (e.g., distance of more than 80 micrometers (um) as measured in an X-Y plane of FIG. 5A). For example, an overlay target spaced apart from a functional structure may be used to acquire a registration overlay measurement. Note that any combination of intermediary structures may be utilized. For example, a measurement between two stacked patterns of structures (e.g., transistors) in layers 3 and 4 may be acquired and combined with a measurement between structures of layers 4 and 5. Such measurements may be tracked throughout some or all of the layers of the sample and used to keep track of a structure at the interface of the sample. In this regard, overlay between the layers of a sample may be tracked using intermediary structures 504 that are near each other and/or spaced apart from each other.

In embodiments, at least one of the first registration measurement, the second registration measurement, or the third registration measurement is based on die-to-database measurements/inspection. Die-to-database measurements are generally acquired by comparing data (e.g., images) collected from a sample to rendered images (e.g., images simulated based on sample design data used to fabricate the sample). For example, at least some methods of acquiring some types of die-to-database measurements are disclosed in U.S. Pat. No. 9,915,625, entitled OPTICAL DIE TO DATABASE INSPECTION, filed on Dec. 27, 2016, which is incorporated herein by reference in its entirety. For purposes of the present disclosure, the term "database data", "design", "design data", and the like generally refer to the physical design (e.g., layout) of an IC and data derived from the physical design through complex simulation or simple geometric and Boolean operations. The physical design may be stored in a data structure such as a graphical data stream (GDS) file, any other standard machine-readable file and may be stored in a design database. A GDSII file is one of a class of files used for the representation of design layout data. Other examples of such files include GL 1 and OASIS files and proprietary file formats such as RDF data, which is proprietary to KLA-Tencor, Milpitas, Calif. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in U.S. Pat. No. 7,570,796 issued on Aug. 4, 2009 to Zafar et al. and U.S. Pat. No. 7,676,077 issued on Mar. 9, 2010 to Kulkarni et al., both of which are hereby incorporated by reference in their entirety. In addition, the design data can be standard cell library data, integrated layout data, design data for one or more layers, derivatives of the design data, and full or partial chip design data. Using design data (e.g., stored on a database) and anchor points to determine measurements of a sample is disclosed in U.S. Pat. No. 10,267,746, issued Mar. 23, 2019, which is hereby incorporated by reference in its entirety. In embodiments, a die-to-database measurement may mean measurements based on comparing rendered design images of a sample with optically acquired images of the sample. For instance, a registration measurement may be based on center-on-center (CoC) die to database (D:DB) measurements. In another instance, a registration measurement to an edge (e.g., first sample edge 230) may be based on comparing a center of an image of an edge with a rendered image to determine the center of the edge. For instance, a registration measurement may be between such a center of the edge and a center of another structure (e.g., repeating intermediary transistor structure or any other structure). In some examples, determining the center of a structure using die-to-database measurements is based on training a machine learning model on rendered design images (e.g., clips) and/or corresponding optical images of the structure. In embodiments, benefits of using die-to-database measurements may allow for negating a need to use dedicated overlay targets by allowing measuring of distance vectors of edges in one structure with respect to various other structures, such as edges, functional structures, and the like. This may allow for using more of the active area of the die for functional structures.

In embodiments, results (e.g., the overlay measurement m4 and other measurements) may be used for any purpose in a sample fabrication process such as in a feed forward and/or feed backward recipe. For example, the results may be used to correct for overlay of the coupled sample 200 of FIG. 2A in a feed backward recipe or may be used to prevent overlay of future coupled samples in a feed forward recipe. For instance, the results may be stored on a system (e.g., external controller and memory such as external server) that is external to the metrology sub-system 102. Examples of such systems include systems configured to compile and reduce data (e.g., results) to generate relevant root cause and yield analysis information. For instance, software (e.g., OVALiS software) on external systems may support on-product process optimization, diagnostics, monitoring and control for lithography and other patterning steps that are critical to IC manufacturing. Further, 5D Analyzer advanced data analysis and patterning control software may be used to provide for an extendible, open architecture that accepts data from a wide range of metrology and process tools to enable advanced analysis, characterization, and real-time control of fab-wide process variations. In embodiments, results may be used for material excursion control or for any other use of a fabrication process.

In an optional step (not shown), method 300 or any other method further includes adjusting an inter-sample coupling recipe based on the overlay measurement m4. For example, an inter-sample coupling recipe may be a recipe stored in memory 112 for determining an alignment, permanent bonding (e.g., fusing), temporary coupling, or any other step in a coupling process. For instance, adjusting an inter-sample coupling recipe may mean adjusting an X-direction position of the first sample 202 temporarily positioned on the second sample 204 based on the overlay measurement m4. In this regard, adjusting an X-direction position may mean moving the X-direction position an amount equal to the overlay measurement m4 such that the overlay measurement m4 is reduced/eliminated. In this regard, the coupled sample may be more accurately aligned. In embodiments, the inter-sample coupling recipe may include a final bonding recipe (e.g., final bonding step to permanently fuse the samples 202, 204). Another example of adjusting an inter-sample coupling recipe may mean adjusting a parameter (e.g., heat, pressure, pre-bonding alignment) such that future permanently bonded samples have a reduced overlay measurement.

In an optional step (not shown), method 300 or any other method further includes adjusting a sample manufacturing recipe based on the overlay measurement m4. For example, adjusting a first sample manufacturing recipe may mean adjusting a deposition and/or etching offset of layers for the first sample manufacturing recipe based on first registration measurements m1$a$, m1$b$, m1$c$, and the like such that the overlay between layers of the first sample 202 is corrected for.

Referring again to FIG. 1, embodiments of various components are described in additional detail.

As noted previously herein, the one or more processors 110 of the controller 108 may be communicatively coupled to memory 112, where the one or more processors 110 may be configured to execute a set of program instructions maintained in memory 112, and the set of program instructions may be configured to cause the one or more processors 110 to carry out various functions and steps of the present disclosure.

It is noted herein that the one or more components of metrology system 100 may be communicatively coupled to the various other components of metrology system 100 in any manner known in the art. For example, the one or more processors 110 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 108 may be communicatively coupled to one or more components of metrology system 100 via any wireline or wireless connection known in the art.

In embodiments, the one or more processors 110 may include any one or more processing elements known in the art. In this sense, the one or more processors 110 may include any microprocessor-type device configured to execute software algorithms and/or instructions. In embodiments, the one or more processors 110 may consist of a desktop computer, mainframe computer system, workstation, image computer, parallel processor, or other computer system (e.g., networked computer) configured to execute a program configured to operate the metrology system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 110. In general, the term "processor" may be broadly defined to encompass any device having one or more processing elements, which execute program instructions from memory 112. Moreover, different subsystems of the metrology system 100 (e.g., metrology sub-system 102, controller 108, user interface, and the like) may include processor or logic elements suitable for carrying out at least a portion of the steps described throughout the present disclosure. Therefore, the above description should not be interpreted as a limitation on the present disclosure but merely an illustration.

The memory 112 may include any storage medium known in the art suitable for storing program instructions executable by the associated one or more processors 110 and the data received from the metrology system 100. For example, the memory 112 may include a non-transitory memory medium. For instance, the memory 112 may include, but is not limited to, a read-only memory (ROM), a random-access memory (RAM), a magnetic or optical memory (e.g., disk), a magnetic tape, a solid-state drive and the like. It is further noted that the memory 112 may be housed in a common controller housing with the one or more processors 110. In an alternative embodiment, the memory 112 may be located remotely with respect to the physical location of the processors 110, controller 108, and the like. In another embodiment, the memory 112 may maintain program instructions for causing the one or more processors 110 to carry out the various steps described through the present disclosure.

In embodiments, the user interface is communicatively coupled to the controller 108. The user interface may include, but is not limited to, one or more desktops, tablets, smartphones, smart watches, or the like. In another embodiment, the user interface includes a display used to display data of the metrology system 100 to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via a user input device of the user interface.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," "downward", "X direction", "Y direction", "Z direction", and the like are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system comprising:
  a metrology sub-system configured to acquire an overlay measurement for an interface target on a coupled sample, wherein the coupled sample, according to a metrology recipe, includes a first sample coupled to a second sample at an interface between couplable faces of the first sample and the second sample, wherein the interface target includes a first interface target structure associated with a couplable face of the first sample and a second interface target structure associated with a couplable face of the second sample; and
  a controller communicatively coupled to the metrology sub-system, the controller including one or more processors configured to execute program instructions causing the one or more processors to:
    determine, on the first sample prior to coupling with the second sample to form the coupled sample, a first registration measurement between the first interface target structure and a first registration structure located on a different layer than the first interface target structure, wherein the first registration structure is configured to be measured by the metrology sub-system through a top face of the first sample opposite the couplable face of the first sample;

determine, on the second sample prior to the coupling with the first sample to form the coupled sample, a second registration measurement between the second interface target structure and a second registration structure, wherein the second registration structure is configured to be unobstructed by the first sample when the first sample is coupled to the second sample to form the coupled sample;

determine, on the coupled sample after the first sample is coupled to the second sample, a third registration measurement between the second registration structure on the second sample and the first registration structure on the first sample at least in part by measuring the first registration structure through the top face of the first sample; and acquire the overlay measurement for the interface target based on the first registration measurement, the second registration measurement, and the third registration measurement.

2. The metrology system of claim 1, wherein the first registration structure is located closer to the top face of the first sample than the first interface target structure according to the metrology recipe.

3. The metrology system of claim 1, wherein the second registration structure comprises an overlay target in a scribe line area of the second sample.

4. The metrology system of claim 1, wherein the program instructions are further configured to:

adjust an inter-sample coupling recipe based on the overlay measurement.

5. The metrology system of claim 4, wherein the inter-sample coupling recipe includes a final bonding recipe.

6. The metrology system of claim 1, wherein the program instructions are further configured to:

adjust a sample manufacturing recipe based on the overlay measurement.

7. The metrology system of claim 1, wherein the metrology sub-system is configured to operate in a visible spectral range of light and an infrared spectral range of light.

8. The metrology system of claim 1, wherein the determining the second registration measurement comprises measuring both the second interface target structure and the second registration structure via an optical metrology sub-system of the metrology sub-system in a visible spectral range of light.

9. The metrology system of claim 1, wherein the metrology sub-system is configured to operate in an infrared spectral range of light.

10. The metrology system of claim 1, wherein the measuring the first registration structure through the top face of the first sample is performed via an infrared-capable metrology sub-system of the metrology sub-system in an infrared spectral range of light.

11. The metrology system of claim 1, wherein a field of view of the metrology sub-system is sufficiently large to simultaneously measure the second registration structure and the first registration structure.

12. The metrology system of claim 1, wherein the determining the second registration measurement comprises a movement of one or more optical elements of the metrology sub-system to deflect illumination from a first field of view (FOV) to a second FOV, wherein the second registration measurement is based on the movement, wherein the second interface target structure is in the first FOV and the second registration structure is in the second FOV.

13. The metrology system of claim 1, wherein the determining the second registration measurement comprises: measuring a position of a first structure; moving the second sample relative to the metrology sub-system by a known distance using a sample translation stage; and imaging a second structure, wherein the first structure and the second structure are one of the second interface target structure or the second registration structure.

14. The metrology system of claim 1, wherein the determining the first registration measurement comprises measuring performed at one or more after-develop inspection (ADI) steps of one or more layers of the first sample via a scanning electron beam (SEM) metrology sub-system of the metrology sub-system.

15. The metrology system of claim 1, wherein the first registration measurement is based on at least one of:

one or more intermediary overlay registration measurements acquired at intermediary manufacturing steps of layers of the first sample; or one or more intermediary direct overlay measurements acquired at the intermediary manufacturing steps.

16. The metrology system of claim 15, wherein the one or more intermediary overlay registration measurements are based on a first scribe line structure.

17. The metrology system of claim 15, wherein the one or more intermediary overlay registration measurements are based on a first sample edge of the first sample.

18. The metrology system of claim 1, wherein the first sample comprises one or more intermediary structures buried within the first sample at one or more intermediary layers.

19. The metrology system of claim 18, wherein the one or more intermediary structures is at least one of an overlay target or a functional device feature.

20. The metrology system of claim 1, wherein the first registration structure is smaller than 3 micrometers in width and length as measured within a plane normal to a depth direction of the first sample.

21. The metrology system of claim 1, wherein the coupled sample includes a bonded sample such that the first sample is fused to the second sample.

22. The metrology system of claim 1, wherein at least one of the first registration measurement, the second registration measurement, or the third registration measurement is based on die-to-database measurements.

23. A metrology method for acquiring overlay measurements of coupled samples comprising:

determining, via a metrology sub-system, a first registration measurement between a first interface target structure and a first registration structure of a first sample prior to a coupling of the first sample to a second sample to form a coupled sample, wherein the first registration structure is located on a different layer than the first interface target structure, wherein the first registration structure is configured to be measured by the metrology sub-system through a top face of the first sample opposite a couplable face of the first sample, wherein an interface target includes the first interface target structure associated with a couplable face of the first sample and a second interface target structure associated with a couplable face of the second sample;

determining, via the metrology sub-system, a second registration measurement between the second interface target structure and a second registration structure of the second sample prior to the coupling of the first sample to the second sample to form the coupled sample, wherein the second registration structure is configured to be unobstructed by the first sample when the first sample is coupled to the second sample to form the coupled sample;

the coupling the first sample to the second sample to form the coupled sample;

determining, via the metrology sub-system on the coupled sample after the first sample is coupled to the second sample, a third registration measurement between the second registration structure on the second sample and the first registration structure on the first sample at least in part by measuring the first registration structure through the top face of the first sample; and acquiring the overlay measurement for the interface target based on the first registration measurement, the second registration measurement, and the third registration measurement.

24. The metrology method of claim 23, further comprising, before the coupling, flipping the first sample over.

25. The metrology method of claim 23, wherein the first registration structure is located closer to the top face of the first sample than the first interface target structure.

26. The metrology method of claim 23, wherein the second registration structure comprises an overlay target in a scribe line area of the second sample.

27. The metrology method of claim 23, further comprising adjusting an inter-sample coupling recipe based on the overlay measurement.

28. The metrology method of claim 27, wherein the inter-sample coupling recipe includes a final bonding recipe.

29. The metrology method of claim 23, further comprising adjusting a sample manufacturing recipe based on the overlay measurement.

30. The metrology method of claim 23, wherein the metrology sub-system is configured to operate in a visible spectral range of light and an infrared spectral range of light.

31. The metrology method of claim 23, wherein the determining the second registration measurement comprises measuring both the second interface target structure and the second registration structure via an optical metrology sub-system of the metrology sub-system in a visible spectral range of light.

32. The metrology method of claim 23, wherein the metrology sub-system is configured to operate in an infrared spectral range of light.

33. The metrology method of claim 23, wherein the measuring the first registration structure through the top face of the first sample is performed via an infrared-capable metrology sub-system of the metrology sub-system in an infrared spectral range of light.

34. The metrology method of claim 23, wherein a field of view of the metrology sub-system is sufficiently large to simultaneously measure the second registration structure and the first registration structure.

35. The metrology method of claim 23, wherein the determining the second registration measurement comprises a movement of one or more optical elements of the metrology sub-system to deflect illumination from a first field of view (FOV) to a second FOV, wherein the second registration measurement is based on the movement, wherein the second interface target structure is in the first FOV and the second registration structure is in the second FOV.

36. The metrology method of claim 23, wherein the determining the second registration measurement comprises: measuring a position of a first structure; moving the second sample relative to the metrology sub-system by a known distance using a sample translation stage; and imaging a second structure, wherein the first structure and the second structure are one of the second interface target structure or the second registration structure.

37. The metrology method of claim 23, wherein the determining the first registration measurement comprises measuring performed at one or more after-develop inspection (ADI) steps of one or more layers of the first sample via a scanning electron beam (SEM) metrology sub-system of the metrology sub-system.

38. The metrology method of claim 23, wherein the first registration measurement is based on:

one or more intermediary overlay registration measurements acquired at intermediary manufacturing steps of layers of the first sample; or one or more intermediary direct overlay measurements acquired at the intermediary manufacturing steps.

39. The metrology method of claim 38, wherein the one or more intermediary overlay registration measurements are based on a first scribe line structure.

40. The metrology method of claim 38, wherein the one or more intermediary overlay registration measurements are based on a first sample edge of the first sample.

41. The metrology method of claim 23, wherein the first sample comprises one or more intermediary structures buried within the first sample at one or more intermediary layers.

42. The metrology method of claim 41, wherein the one or more intermediary structures is at least one of an overlay target or a functional device feature.

43. The metrology method of claim 23, wherein the first registration structure is smaller than 3 micrometers in width and length as measured within a plane normal to a depth direction of the first sample.

44. The metrology method of claim 23, wherein the coupling includes a fusing of the first sample to the second sample.

45. The metrology method of claim 23, further comprising, after the coupling and the acquiring the overlay measurement, fusing the first sample to the second sample based on the overlay measurement.

46. The metrology method of claim 23, wherein at least one of the first registration measurement, the second registration measurement, or the third registration measurement is based on die-to-database measurements.

* * * * *